(12) United States Patent
Freitag et al.

(10) Patent No.: US 6,479,560 B2
(45) Date of Patent: Nov. 12, 2002

(54) FOAMING COMPOSITIONS AND METHODS FOR MAKING AND USING THE COMPOSITION

(75) Inventors: James W. Freitag, Kearney, MO (US); Donald W. Taylor, Liberty, MO (US); Jess Rogers, Excelsior Springs, MO (US); Jeffrey T. Pachl, Holt, MO (US)

(73) Assignee: Denovus LLC, Moberly, MO (US)

( * ) Notice: Subject to any disclaimer, the term of this patent is extended or adjusted under 35 U.S.C. 154(b) by 0 days.

(21) Appl. No.: 09/578,206

(22) Filed: May 24, 2000

(65) Prior Publication Data

US 2002/0115737 A1 Aug. 22, 2002

Related U.S. Application Data

(63) Continuation-in-part of application No. 09/344,198, filed on Jun. 24, 1999, which is a continuation-in-part of application No. 09/300,930, filed on Apr. 28, 1999, which is a continuation-in-part of application No. 09/197,124, filed on Nov. 20, 1998, which is a continuation-in-part of application No. 09/081,967, filed on May 20, 1998.

(60) Provisional application No. 60/047,273, filed on May 21, 1997, and provisional application No. 60/079,205, filed on Mar. 24, 1998.

(51) Int. Cl.$^7$ .................................................. C08J 9/02
(52) U.S. Cl. ........................ 521/130; 521/97; 521/135; 521/178
(58) Field of Search ............................... 521/135, 178, 521/97, 130

(56) References Cited

U.S. PATENT DOCUMENTS 3,154,504 A * 10/1964 Carey et al. ................. 521/135
4,923,902 A * 5/1990 Wycech ....................... 521/135
5,274,006 A * 12/1993 Kagoshima et al. ........ 521/135

* cited by examiner

Primary Examiner—Morton Foelak
(74) Attorney, Agent, or Firm—Michael K. Boyer

(57) ABSTRACT

A low-temperature foam compositions and that are produced from an epoxy compound and an acid source can be substantially free of polyurethane or isocyanate chemistry. The disclosed compositions and precursors thereof reduce, if not eliminate, the presence of conventional undesirable compounds and by-products thereof.

13 Claims, 1 Drawing Sheet

FOAMING COMPOSITIONS AND METHODS FOR MAKING AND USING THE COMPOSITION

CROSS REFERENCE TO RELATED PATENT APPLICATIONS

This is a continuation-in-part of U.S. patent application Ser. No. 09/344,198, filed on Jun. 24, 1999 as a continuation in part of U.S. Ser. No. 09/300,930, filed on Apr. 28, 1999, that is a continuation in part of Ser. No. 09/197,124, filed on Nov. 20, 1998, that is a continuation-in-part of Ser. No. 09/081,967, filed on May 20, 1998 and entitled "Novel Foaming Compositions and Methods For Making and Using the Composition". The disclosure of these prior filed patent applications is hereby incorporated by reference.

The subject matter herein claims benefit under 35 U.S.C. 111(a), 35 U.S.C. 119(e) and 35 U.S.C. 120 of U.S. Provisional Patent Application Ser. No. 60/047,273, filed on May 21, 1997, entitled "A Room Temperature Foaming Composition"; and U.S. Provisional Patent Application Ser. No. 60/079,205, filed on Mar. 24, 1998, entitled "Novel Foaming Compositions and Methods For Making and Using the Compositions". The disclosure of the aforementioned Provisional Patent Applications is hereby incorporated by reference.

The subject matter of the instant invention is also related to non-provisional patent application Ser. Nos. 09/081,966, filed on May 20, 1998 and Ser. No. 09/197,107, filed Nov. 20, 1999, both filed in the name of Jeffrey Pachl et al., and entitled "Curable Sealant Composition". The disclosure of these Non-provisional patent applications is hereby incorporated by reference.

FIELD OF THE INVENTION

The invention relates to foam compositions, precursors thereof and methods for making foam compositions and foam containing articles.

BACKGROUND OF THE INVENTION

Foams are employed in a wide range of commercial applications including applications requiring thermal and sound insulation such as automotive and construction environments, among others. In the automotive industry, foams are typically formed in situ, and can be used to fill cavities such as pillars and rocker panels, and to dampen sound transmission. In situ foam formation has typically been accomplished by using a polyurethane foam based on isocyanate chemistry. Certain polyurethane foam components and by-products thereof are believed to have an undesirable environmental impact. Consequently, there is a need in this art for a low-temperature foam which is cost-effective and substantially free of undesirable materials.

SUMMARY OF THE INVENTION

The invention is capable of solving problems associated with conventional foam formulations by providing foam compositions and precursors thereto which do not require the use of isocyanates. The inventive compositions and precursors can thereof reduce, if not eliminate, the presence of conventional undesirable compounds and by-products thereof while providing benefits associated with conventional foams, e.g, sound/vibration dampening, thermal insulation, structure reinforcement, floatation, energy dissipation, among other benefits. In addition, the inventive foam has a reduced cured and tack time in comparison to conventional polyurethane foams. These properties in turn improve the efficiency of manufacturing processes that employ foam.

One aspect of the invention relates to a method of reacting an epoxy compound and a hydrogen donor or acid compound at ambient conditions to produce a foam. This reaction can produce a relatively large exotherm. The heat released by the exothermic reaction can be sufficient to drive an endothermic blowing agent, thus creating a foam virtually instantaneously. In fact, the exothermic reaction can be sufficiently large to cause a blowing agent entrapped within, for example, thermoplastic powders to expand thereby forming a foam.

Another aspect of the invention relates to a method of containing the foam during expansion by expanding the foam within a containment or control means. The control means confines the expanding foam and determines the direction of expansion. While any suitable control means can be employed, a polymeric bag or sack is desirable. If desired, the polymer bag comprises an adhesive material, e.g., the bag adhesive is activated by the exothermic foam reaction and affixes the resultant foam to a substrate. The polymeric bag can be fabricated from a virtually unlimited array of materials and configured into any desirable shape, e.g., a honeycomb structure, replicating an automotive cavity, etc.

The inventive foam can be employed in a wide array of end-uses. Examples of such uses include thermal insulation such as appliances, e.g., refrigerators, hot water heaters, etc; aircraft; commercial or residential construction such as spray or rigid insulation for walls, doors, cavity/widow sealant, acoustical control, etc.; packing material, e.g., foam-in-place; marine foams; environmental control, e.g., spill containment; footware; furniture; toy and consumer goods; protective equipment such as pads, helmets, etc.; fluid filtration; transportation industry uses, e.g., sound dampeners, structural supporting material, etc. for cars, trucks and heavy duty vehicles; vehicle repair; gasketing material; medical uses such as casts, emergency immobilization, etc.; artistic medium such as decorative brick/block, figures, etc.; among others.

DETAILED DESCRIPTION

Figure 1:
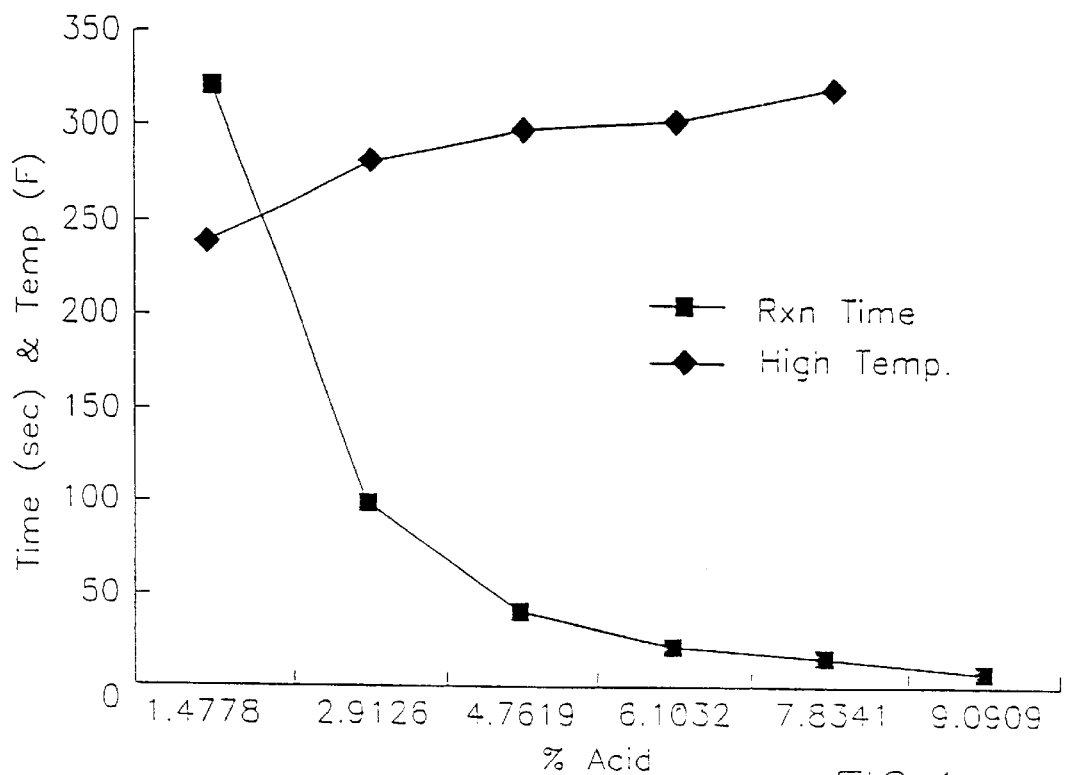
FIG. 1 is a graphical representation of the foam reaction rate and temperature as a function of percent acid.

The invention is based, at least in part, on the surprising discovery that superior foam compositions can be produced from epoxy compounds and acids or hydrogen donor compounds, and in particular, a reaction of the epoxy compounds with the acid source.

Moreover, the inventive compositions can be polyurethane and/or isocyanate free. By "free" it is meant that the inventive compositions before or after foaming contain less than about 10 wt. % polyurethane and/or isocyanurates, isocyanate, and in most cases 0 wt. %. While the presence of such compounds does not adversely affect the reaction described below in greater detail, these materials can be obviated by employing the inventive formulations. The instant invention, therefore, provides a foam which can be used with or instead of urethane/isocyanate based foams and foaming systems.

The inventive foam composition is typically obtained from the reaction of one or more foam precursors. The precursor(s) comprise (i) at least one epoxy compound, and (ii) at least one acid source, i.e., a hydrogen donor or an acid, e.g., phosphoric acid, or a compound such as a photoinitiator which can upon activation provide a hydrogen donor or an acid, and (iii) at least one expansion or blowing agent, among other components. An exothermic reaction between the epoxy and hydrogen donor or acid can activate the expansion or blowing agent thereby producing a foam.

The foam precursor(s) can comprise a single phase system that is activated in response to a source of energy, e.g., heat, UV or electron beam or laser radiation, among other energy sources, or a two component system (an A side precursor and a B side precursor) that are contacted together to produce a foam. When a two component system is employed the epoxy and acid source are provided in separate "side" components.

Alternatively, the foam precursor(s) can comprise a two component system that is activated in response to a source of, e.g., heat, UV or electron beam or laser radiation, among other energy sources. The two component system can include an acid source as well as a photoinitiator.

The first component of the precursor(s), an epoxy compound, comprises about 10 to about 80 wt % of the precursor(s). Examples of suitable epoxy compounds include bis-phenol A epoxy, bis-F epoxy, epoxy-modified elastomers, epoxy-modified polybutene, epoxy-modified polybutadiene, epoxy-modified ethylene-propylene-diene rubber (EPDM), cycloaliphatic epoxy, novolac compounds, and mixtures thereof, among others. When a two component system is employed, the epoxy is located on the A-side, or otherwise prevented from prematurely reacting with the acid or other precursors.

The first component of the precursor can be tailored by adding one or more modifiers. For best results, the modifier is solublized by the epoxy or miscible with the epoxy. Examples of suitable modifiers can comprise at least one member selected from the group consisting of styrene and co-polymers thereof, vinyls and co-polymers thereof, elastomers such as nitrile. ethylene acrylic rubber, mixtures thereof, among others compounds that do not adversely impact the exothermic reaction. Some commercially available materials that can be employed as a modifier comprise Kraton® (Shell Chemical), Vamac® (DuPont), Piccolastic® (Hercules), Phenoxy® (Paphen), SAA® (styrene-allyl-alcohol copolymer (ARCO), G-Cryl® (Henkel), Rohagum® (Rhomtech), acrylate modified acidic adhesion promoting agent (acid functional oligomer, RadCure®), mixtures thereof, among others. Normally, the epoxy modifier comprises about 2 to about 50 wt. % of the composition prior to foaming.

A second component of the precursor(s) is the acid source. When a two component precursor system is employed, the acid source is present in the "B side" of the foam precursors. The hydrogen donor or acid usually comprises about 1% to about 30 wt. % of the precursor, and in particular, about 3% to about 15% of precursor B-side precursors. Examples of suitable acid sources include Lewis acids such as sulfonic acids, phosphoric acid, citric acid, carboxylic acid, glycolic, tannic, 1,2,4,5-Benzenenetracarboxylic acid, citraconic acid, L-(+)-Citrulline, fumaric, maleic, azelaic, oxalic acids, and mixtures thereof, among others. Particularly desirable results have been achieved by employing at least one of sulfonic, phosphoric acids and other acid functional compounds, e.g., acid functional acrylics. Depending upon the desired reaction rate and resultant foam characteristics, a relatively concentrated acid can be employed. An example of such a concentrated acid comprises a phosphoric acid that is substantially free of water. By "substantially free" it is meant that the acid contains less than about 10 wt. % and normally less than about 5 wt. % water. Substantially water free acid can be obtained by distilling commercially available acids, e.g., 75% phosphoric acid can be concentrated by distillation. In the case of phosphoric acid, concentration by distillation permits obtaining at least one of meta, ortho and pyro-phosphoric acids. At least one of ortho or pyro-phosphoric acid and mixtures thereof are effective as an acid source when a relatively strong and rigid foam is desired, e.g., an acid source comprising about 50 to greater than 90 wt. % ortho-phosphoric acid. If desired, the acid can comprise an acid functionally equivalent to the hydrogen donor released by a UV photoinitiator, e.g., replace a portion of the photoinitiator with its corresponding acid.

In one aspect of the invention, an acid substantially free of water is employed to obtain a foam precursor that generates foam having improved structural properties, e.g., foam having a flexural strength about 20 to 100% greater than many conventional materials such as wooden particle board. By employing a substantially water free acid as a foam precursor, the resultant foam has a lower expansion and water absorption, and greater structural strength and adhesion, e.g., to a painted or primed metal surface, wood, particle board, corrugated paper such as honeycomb, ABS, Formica®, Masonite®, thermoplastics such as polystyrene, among other surfaces. Substantially water free acids can also permit using a wider range of precursors, e.g., non-polyol carriers.

The adhesion of the foam to certain substrates, e.g., ABS, can be improved by pre-treating or priming the substrate surface. An example of a suitable primer comprises applying a silane coating (e.g., Z6040 supplied by Dow Chemical) onto the surface. The silane forms a coating to which the foam can adhere. Adhesion can also be improved by embossing or roughening the surface of the substrate.

A mechanical fastener can be attached to or incorporated within the substrate such that the foam embeds the fastener. The fastener can comprise a plurality of protrusions, studs or mechanical fastening means having any desirable shape can be located within a cavity to be filled with foam and/or attached to the substrate that contacts the foam. When studs are employed, the studs can be welded, e.g., sonically welded to a thermoplastic, within a cavity to be filled with foam. Protrusions can also be affixed within the cavity or upon the surface by a suitable adhesive, or by mechanical attachment. The height and specific configuration of the protrusions depends upon the application. These protrusions can be fabricated from any suitable material such as thermoplastics such as nylon, metal, among other materials. When introduced into the cavity, the inventive foam composition or precursors thereof embeds the protrusions, fills the cavity and embeds the protrusions thereby affixing the foam within the cavity or onto a substrate.

In another aspect of the invention, the hydrogen donor comprises a photo-initiator that becomes active when exposed to a source of energy. While any photoinitiator capable of becoming a hydrogen donor upon activation can be employed, specific examples of a suitable photoinitiators include a UV catalyst such as UVI 6974 (Union Carbide) that is described in greater detail in the aforementioned copending and commonly assigned U.S. non-provisional patent application Ser. Nos. 09/081,966, filed on May 20, 1998 and Ser. No. 09/197,107, filed Nov. 20, 1999, both filed in the name of Jeffrey Pachl et al., and entitled "Curable Sealant Composition". Alternatively, free radical photoinitiators can be employed. An example of a free radical photo-iniator comprises 2-hydroxy-2-methyl-1-phenyl-propan-1-one, e.g., DAROCUR® 1173 (Ciba-Giegy). Free radical photoinitiators can be employed in systems comprising at least one of monomers and oligomers such as acrylated oligomers, urethane acrylates, acrylated epoxies, acrylated acrylics, acrylated polyesters, acrylated polybutadiene, methacrylated counterparts thereof, among others. When such initiators are employed, the foam precursors can be utilized in a single or multi-phase system.

For example, such a single phase system can be dispensed, exposed to a UV light source or other suitable source of energy that causes the UV catalyst to generate an acid thereby permitting the epoxy or free-radical reaction to occur. The heat released by the exothermic reaction in turn activates an expansion or blowing agent, e.g., a hydrocarbon encapsulated within a thermoplastic, thereby producing a foam. While any suitable single or two phase system can be employed, normally a single phase system produces a foam that is thin relative to a two phase system. Similar to other foam precursors, the radiation activated precursors can be modified for controlling the properties of the precursors or resultant foam, e.g., about 1 to about 20 wt. % polystyrene is added to the epoxy component.

The blowing agent can comprise one or more of the blowing agents recognized in the foam-forming field. Example of suitable blowing agents include water, hydrazide, diphenyloxide-4,4-disulphohydrazide, carbonamide, azocarbonamide, hexamethylene diamine carbamate, sodium bicarbonate, dimethyl ether, methylene chloride, carbon dioxide, fluorocarbons such as difluoroethane, tetrafluoroethane, HFC-4310, azeotropes and isomers thereof, among others; and hydrocarbons such as isobutane, butane, propane, pentane, isopentane, alcohol, isomers thereof; mixtures thereof, among other known blowing agents. Normally, the expansion or blowing agent comprises about 1 to about 40 wt. % of the foam precursor(s). The blowing agent can be present in either the A or B side of a two component system, although the B-side precursor is preferred.

The foam precursor(s) can also include at least one carrier component, e.g., a polyol, and optional components such as thermoplastics. A carrier usually comprises about 1 to about 40 wt. % of the precursor, e.g., preferably about 10–30 wt. %. The carrier typically serves to deliver a component, e.g., an acid, expanding agent, catalyst, mixtures thereof, among others for contact with the epoxy. Examples of suitable carriers comprise at least one member selected from the group of polyols including polyester, polyether, polycarbonate and caprolactone; alcohol, polyvinyl alcohol, synthetic or natural oils such as castor, soy, linseed, glycerin and glycols; water, among other carriers that are preferably miscible with the epoxy and mixtures thereof. When a two component precursor system is employed, these carrier materials are typically added to the acid side or "B side" component of the foam precursors In addition to the aforementioned epoxy modifiers, the components of the precursor can be tailored by adding one or more modifiers in order to control viscosity, improve stability, physical properties, reaction rates, color, odor, among other characteristics. For best results, the modifier is soulblized by the carrier or miscible with a carrier. Examples of suitable modifiers can comprise at least one member selected from the group consisting of natural and synthetic oils such as at least one of castor, soy, canola, linseed, polybutene, epoxidized counterparts thereof, among other oils. Epoxized natural oils such as epoxized castor oil can be employed as a Part A component. The addition of castor oil can also produce a foam having an exterior glaze or skin. Normally, the carrier modifier is used about 2 wt. % to about 50 wt. % of the composition prior to foaming.

Moreover, the density, moisture and temperature resistance among other physical properties of the final foam product can be modified or tailored by adding a thermoplastic, theromset, plastic or resinous material to the epoxy-containing precursor. While any suitable modifying material can be employed, examples of such modifying materials include dicyandiamide (Dicy (Amicure CG 1400)), ethylene vinyl acetate, polypropylene, polyethylene, rubber, phenoxy resin, phenolics, powdered wax, solid epoxy such as bis-A epoxy or modified epoxy, novalac compound, mixtures thereof, among others. For example, depending upon the relative concentration of the components of the precursor, polyvinyl alcohol, hydroscopic polyolefin such as modified polypropylene (as well as other suitable materials) can be employed as modifiers and for absorbing steam or water generated by or during the exothermic reaction. About 1 to about 60 wt. % of modifying material can be added relative to the epoxy, e.g., about 2 wt. % of the precursor(s). The modifying material will normally comprise a powder having a particle size less than about 20 microns and a melting point from about 150 to about 400 F. The modifying material will become fluid and normally melt when exposed to the exothermic reaction temperature. When a two component precursor system is employed, these materials are normally, but not necessarily, combined with the epoxy or "A side".

The foam precursors can also include a thermoplastic component that can function to modify the properties of the resultant foam, reduce material cost, increase precursor shelf life, among other desirable results. The thermoplastic component of the foam precursor(s) can comprise at least one member selected from the group consisting of acrylonitrile, polyethylene, phenolic, wax, EVA, polypropylene, GMA, acid modified polyethylene, polybutadiene, modified polyethylene blend (such as Bynel® supplied by DuPont Company), SIS or SBS or SEBS blocked copolymers (such Kraton® supplied by Shell Chemical), oligomers, polyolefin, hydroxyl or epoxy functional compounds, among other thermoplastic materials that can be dispersed in a foam precursor and have a melting point less than about the aforementioned exothermic reaction and mixtures thereof. Normally, the thermoplastic component of the precursor will comprise about 1% to about 60 wt. % of the precursor. The thermoplastic component can possess any desirable configuration or particle size. In some cases, the thermoplastic component can form a film or skin upon an exterior surface of the foam thereby improving the resistance of the foam to fluids, e.g., water, gasoline, among other fluids.

In an aspect of the invention, the flame resistance of the foam can be improved by adding an effective amount of at least one member selected from the group consisting of halogenated epoxy as a component of the epoxy (brominated epoxy Erisys® GE-29), aluminum trihydrates, zinc borate, among other commercially available flame retardants. If desired, a halogenated epoxy can replace a portion of the Part A epoxy. Normally, the flame retardant comprises about 0.5 to about 15 wt. % of the unexpanded foam composition.

In one particularly useful aspect of the invention, a liquid or gaseous blowing agent is combined with or encapsulated within a thermoplastic particle or powder, e.g., a hydrocarbon encapsulated within an acrylonitrile shell as in Expancel® that is supplied by Expancel Inc., a division of Akzo Nobel Industries. When a two component precursor system is employed, the shells are normally combined on the B side along with the carrier. These shells can, however, be combined with the A side or in a single phase system so long as the composition of the shells is not substantially affected by the epoxy, e.g, the acrylonitrile or vinylidene chloride shells may be soluble within the epoxy. For example, the shells can be fabricated from polyolefins such polyethylene and polypropylene; vinyls, EVA, nylon, acrylics, among other materials not soluble in the epoxy component, and mixtures thereof could be present in the epoxy component of a two phase precursor system. The shells are selected to melt, soften, expand, rupture or retain their physical configuration depending upon whether or not an open or closed cell foam is desired. The shells can also comprise a distribution of differing particle sizes, composition and activation temperatures, e.g., a foam precursor comprising at least two different particle sizes and activation temperatures. A foam comprising particles having a range of sizes and compositions is especially desirable when producing an acoustical foam. The acoustical properties of a foam can also be improved by employing particles encapsulating blowing agents of more than one composition, e.g., employing shells encapsulating differing blowing agents. Specific examples of suitable encapsulated blowing agents comprise at least one member selected from the group of hydrocarbons such as isobutane and isopentane; fluorocarbons such as 1-1dichloroethene, HFC-134a, HFC-152a; and nitrogen releasing chemical blowing agents such as those supplied as Celogen® by UniRoyal that are encapsulated within any suitable thermoplastic, e.g., 2-methyl 2-propenioc acid methyl ester polymer with 2-propenenitrile and vinylidene chloride polymer and polyvinylidene fluoride. These materials are supplied commercially by Expancel, Inc., a division of Akzo Nobel as Expancels® 051WU, 051DU, 091DU80, 820WU, 820DU, 642WU, 551WU, 551WU80, 461DU or Micropearl® F30D supplied by Pierce and Stevens. These materials can be supplied in either dry or wet form. These materials can also be coated with any suitable material for controlling the activation temperature of the encapsulated blowing agents. An example of a coating comprises an acrylated materials, waxes, among other materials. When the A and B sides are contacted (or in the case of a single phase system exposed to an energy source), the epoxy reacts with the hydrogen or acid thereby releasing heat and causing the expansion agent within the shells to foam. The foam can be characterized by a composite wherein the epoxy reaction product (including of the aforementioned modifying materials) forms a matrix that embeds the expanded shells. Depending upon the physical characteristics desired in the foam, the shells can be open or closed cells.

In a further aspect of the invention, the encapsulated foam precursor can comprise at least one member selected from the group consisting of an acid source, a curing agent, surfactants, epoxy accelerators, among other foam precursors. By curing agent it is intended to mean one or more compositions, other than an acid source, that causes an epoxy functional material to react, exotherm, and cross-link. Examples of curing agents comprise at least one member selected from the group consisting of imidazoles, amines, amides, derivatives thereof, among others. If desired an encapsulated or unencapsulated acid source can be employed in conjunction with an encapsulated curing agent. An example of an encapsulated or polymer bound curing agent comprises those supplied by Landec as Intelimer® 7001, 7002, 7004, 7024 and mixtures thereof. By employing one or more encapsulated or polymer bound foam precursors, it is possible to produce a foam by a multiple stage reaction method wherein the resultant foam has enhanced physical properties, e.g., density, water absorption, hardness and strength.

The foam characteristics can also be modified by adding one or more filler materials to the precursor(s). Conventionally used filler materials comprise at least one of talc, mica, magnesium silicate, oxidized polyethylene, sodium silicate, alcohols, petroleum jelly, aromatic acid methacrylate-mixed half esters, methacrylated polybutadiene, concrete mix (supplied commercially as Quickrete®), arylalkoxy silane, hollow ceramic spheres, inorganic microspheres, dispersants, conventional blowing/expansion agents, flame retardants such as phosphates, borates and halogenated compounds; plasticizers, diluents, pigments, colorants, metal or ceramic powders, soybean hulls, pecan hulls, rice hull, antimicrobial agents such as fungicides, fumed silica, abrasive materials, magnetic materials, anti-static or conductive materials, mixtures thereof, among others. If desired calcium carbonate can be added to the foam precursor for increasing the hardness and density of the resultant foam. When included the filler comprises about 1 to about 60 wt. % of the foam precursors.

The inventive foam can be matrix that embeds or contacts other materials in order to obtain a composite structure. The compositing materials can comprise the aforementioned filler materials, previously formed preform or structures, e.g., honeycomb, fibrous mat, shaped particulate member, honeycomb structures, syntactic materials such as described in U.S. Pat. No. 4,568,603 hereby incorporated by reference; among others. The compositing material can be added to a foam precursor and/or introduced when foaming the precursors. In one aspect, the compositing material comprises styrene pellets, e.g., recycled packaging material, that is ground and added to the previously described carrier. These pellets function to reduce weight and cost of the resultant foam. In another aspect, the compositing material comprises a material for improving the compressive strength of the foam and/or spacers for limiting the degree to which the foam can be compressed, e.g., nylon, polyolefins, polyethylene, among other materials. The compressive strength improving materials can be of any suitable form such as cubes, beads, mixtures thereof, among other shapes.

In one aspect of the invention, one or more foam precursors interact to form an intermediate foam precursor. The intermediate foam precursor can correspond to a Part A and/or Part B. The intermediate foam precursor can be contacted with another precursor or another intermediate foam precursor in order to obtain a foam. A carrier such as a polyol, e.g., a polyester polyol, can interact with at least one member selected from the group of an acid source, e.g, phosphoric acid; a modifier, e.g., styrene; among other precursor components. An epoxy can interact with at least one member selected from the group of an acid source, e.g., phosphoric acid; a modifier, e.g., styrene; among other precursors that are miscible with the epoxy. If desired the aforementioned carrier containing intermediate product is contacted with the aforementioned epoxy containing intermediate product to obtain a foam. The intermediate precursor can be self-supporting. The combined intermediate products can produce a gel-like product that in turn is converted to a foam, e.g, the intermediate product can comprise a gel that can be shaped prior to onset of foam formation.

The precursor(s) and/or intermediate products thereof can be pre-blended and stored in separate containers prior to use. To this end, an A-side or first precursor mixture is typically obtained by combining the epoxy and modifying material, e.g, polyvinyl alcohol and polypropylene, and a B-side or second precursor mixture can be obtained by combining the carrier, e.g., a polyol, hydrogen donor/acid and thermoplastic, e.g., encapsulated blowing agent.

The precursor(s) can be produced using any suitable apparatus that imparts an amount of shear sufficient to obtain a substantially homogenous precursor. Examples of suitable apparatus comprise hand mixing, static tube mixtures, the structures described illustrated by FIGS. 2A and 2B (described below in greater detail), impingement spraying precursors, extrusion, e.g., a twin screw extruder, among other conventional apparatus. Normally, the samples are mixed for about 1 to about 40 seconds depending upon the composition and mixing environment, e.g., a 1:1 A:B composition can be mixed for about 1 to about 10 seconds in a static tube mixer.

The inventive method involves contacting the epoxy compound and acid or hydrogen donor under conditions effective to provide an exothermic reaction. The heat produced from the reaction can then cause the blowing agent(s) to expand in forming the desired foam. For example, where two precursors, A and B are employed, the two compositions can be combined—to obtain a foam by using conventional foam manufacturing equipment. For example, A-side and B-side can be contacted as two high pressure streams within a mixing chamber of an external mix-head. While heat can be added to the precursors, the reaction between "A" and "B" can occur at ambient conditions, e.g., to control viscosity, adjust reaction rate, etc. The ratio of A-side to B-side normally ranges from about 1:1 to about 10:1 or 1:10.

An example of a combined A and B side precursor composition is set forth in the following Table.

TABLE

| Chemical Name | Trade Name | Supplier | Wt. % | Equivalent |
|---|---|---|---|---|
| Cycloaliphatic Epoxy | Uvacure 1500 | UCB Radcure | 1–80 | Sartomer-SARCAT ® K126 |
| Caparolactone | Tone 0301 | Union Carbide | 0–70 | — |
| Phosphoric Acid | Phos. Acid | J. T. Baker | 1–20 | commodity |
| Themoplastic | Expancel | Nobel Industries | 1–50 | Pierce & Stevens-Micropearls ® |

The pH of the A-side component (containing the epoxy compound(s)) is normally about 6 to at least about 8. The pH of the B side of the foam precursor comprising an acid and a carrier is normally about 0.5 to about 4, e.g., the pH of phosphoric acid when mixed with polyol. Normally, the pH prior to reaction with A-side precursors is about 1.6. The composition and concentration of the foam precursors can be modified to achieve a predetermined reaction rate e.g., by tailoring the concentration of the acid. The affects of the pH or acid concentration of the B side are better understood by reference to FIG. 1 which illustrates the affects upon the composition demonstrated in Example 9.

Referring now to FIG. 1, FIG. 1 is a graphical representation of % acid in the precursor versus foam reaction time and temperature. FIG. 1 illustrates that as the acid concentration increases the reaction temperature increases and the reaction time decreases. FIG. 1 also illustrates that the precursor can be selected to a predetermined reaction time/temperature. For example, by selecting a higher reaction temperature (higher acid concentration) a wider range of modifying materials can be employed whereas by selecting a slower reaction time (lower acid concentration) the foam has easier handling characteristics.

The viscosity of a foam precursor can be tailored to enhance the resultant foam characteristics. The viscosity of the "A-side" or epoxy component of the foam precursor is normally controlled, for example, so that a modifying material, e.g., a plastic powder, becomes or remains dispersed within the "A-side" precursor. While any suitable viscosity control agent can be employed desirable results can be achieved by using a solid polymer (in particulate form) to produce a foam precursor gel.

Examples of suitable solid polymers comprise at least one member selected from the group consisting of waxes, polyethylene, EVOH, PVOH, fluoropolymers and dispersions thereof such as polytetrafluoroethylene (supplied as Teflon® by the DuPont Company), among others. The viscosity control agent can range in particle size of about 20 to 50 microns, e.g,. less than 325 mesh. An example of a controlled viscosity composition comprises about 5 to about 10 wt. % solid epoxy, about 5 to about 15 wt. %, powdered polyethylene and about 25 to about 30 wt. % blowing agent. In addition to viscosity, the characteristics of the foam can be tailored by varying the temperature, pressure, foam pH, foam density, among other parameters known to those skilled in this art. Also, the "A-side" of the system can be thickened into a gel by the addition of a surfactant such as any commercially available liquid detergent or titanate such as Kenrich KRTTS, e.g., about 0.1 to about 10 wt. % surfactant. This enables a more complete Theological control, included insuring the homogeneity of the system.

As discussed above, the foam can be produced from a single-phase system, e.g., only an "A-side" mixture. An example of such a system comprises an epoxy, a polyol, thermoplastic spheres, modifying materials, phenoxy, polypropylene, mixtures thereof, among other components. This one component system can be heat activated. In other words the system expands by being exposed to elevated temperature, e.g., about 125C. If desired the single phase foam system can be initiated by employing a photo-initiator instead of, or in conjunction with, an elevated temperature. Examples of such initiators comprise at least one member selected from the group consisting of Union Carbide UVI 6974 among others. Normally, the amount of such an initiator corresponds from 0.5 to about 5 wt % of the foam precursor. More details regarding photoinitiators can be found in "Photopolymerization Behavior of Several Cationic Photoiniators in Catatonically Cured Resin Systems" by Edward Jurczak; that is hereby incorporated by reference.

Single phase systems are especially useful when applied upon a substrate by being sprayed. For example, the single phase system can be sprayed upon an automotive subassembly for reducing the amount of sound transmission to the interior of the car. In a further example, the single phase system can be sprayed upon a first component, e.g., a plastic fascia, exposed to UV to cause foaming and affixed upon a second component, e.g, metal support member, wherein the foam functions to reduce vibrations between the components.

A composite foam structure can be obtained in accordance with the instant invention. A structural modifier such as fibers, particles, rods, tubes, powders, mixtures thereof, among others, can be incorporated as a component of the foam precursor. The structural modifier can be employed for tailoring the chemical and/or physical properties of the resultant foam. Examples of suitable structural modifiers, normally as chopped fibers, ceramic or glass spheres or powders, can comprise at least one of nylon, carbon, carbonates, polymers such as polyethylene and polypropylene, graphite, Kevlar®, Dyneon, ceramic, fiberglass, mineral fillers, e.g., mica, metals, among other materials. The amount of such structural modifiers normally comprises about 1 to about 60 wt. % of the uncured foam precursor.

Any suitable commercially available foam production equipment can be employed for mixing and dispensing the inventive foam precursors to obtain the inventive foam. Examples of such equipment comprises DoPag (ECONO-MIX) supplied by Kirkco Corporation, Monroe, N.C.; as well as equipment supplied commercially by Jesco Products Company, Inc, Sterling Heights, Mich. Another example comprises using an Econo-Mix pump in combination with an Albion static mix head. The foam precursors can also be mixed by employing a power mix gun such as supplied by Sealant and Equipment Company, Oak Park, Mich. If desired, the inventive foam can be expanded within a cavity, e.g., an automotive A pillar, by employing a dispensing apparatus having a replaceable/disposable static mix head. That is, the static mix head can comprise a replaceable plastic tubing having a center piece with a helix or vortex configuration, that is connected to a pump discharge flange and inserted into the cavity for foaming the precursors.

In one aspect of the invention, the inventive foam is dispensed through a commercially available dual tube dispenser (e.g., a 4:1 dual tube dispenser supplied by Tah Industries). That is, one of dual tubes is loaded with an inventive Part A composition and the other tube contains an inventive Part B. The Part A and B are dispensed by the dual tube dispenser and pass through a static tube mixer (also known as a motionless mixer). The Part A and B are contacted by the static tube mixer thereby causing the Parts A and B to react and produce a foam. When dispensing the inventive compositions via a dual tube dispenser, the inventive compositions can be employed as replacement for conventional caulks as well as commercial cavity filling foams, e.g., polyurethane foams.

Figure 2A:
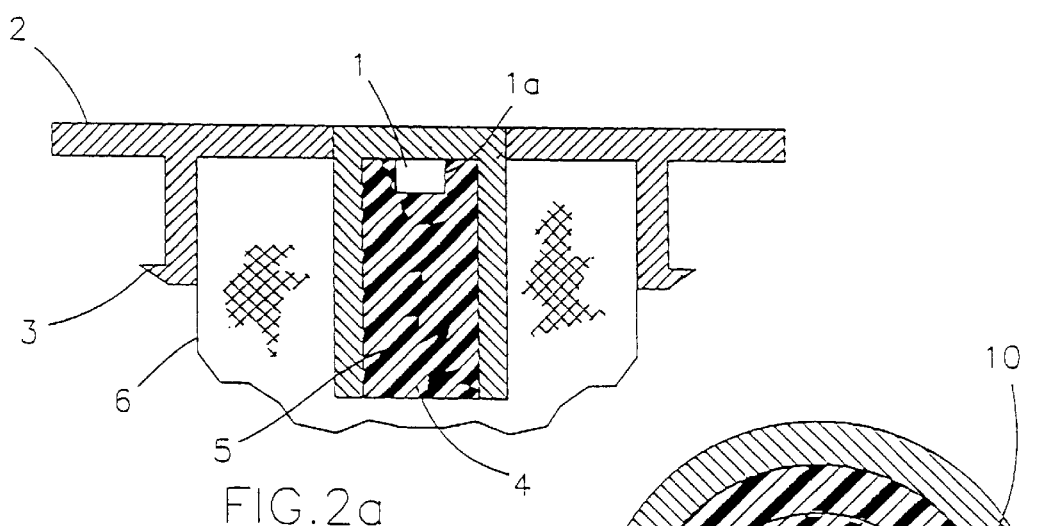
FIGS. 2A and 2B are a schematic drawings of assemblies that can be employed for dispensing the inventive foam within a defined cavity or area.
Figure 2B:
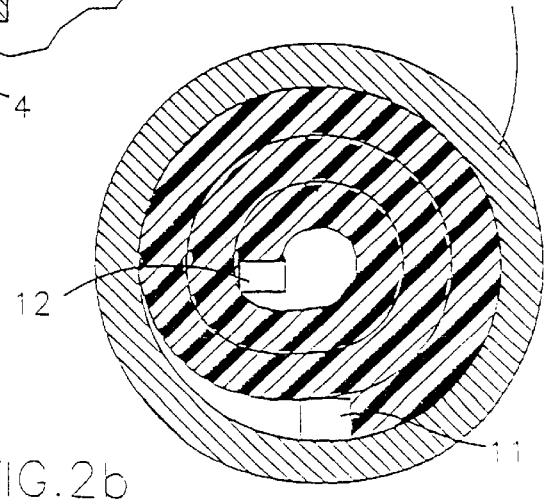

Another static mix head design has a valve type of arrangement that is illustrated in FIGS. 2A and 2B. Referring now to FIG. 2A, FIG. 2A illustrates a one-way value type of arrangement wherein the foam or precursors thereof are introduced or injected via a one-way valve 1 (commonly known as a zerk) that is positioned within a cap 2. Valve 1 can also include a flap or secondary valve 1A that prevents foam from escaping by reverse flow through valve 1. The cap 2 seals or defines one end of a cavity being filled with foam. The cap 2 can include hooks or locking tabs 3 for securing the position of cap 2, e.g, within the so-called A pillar of an automobile thereby permitting foam to be dispensed within the automotive cavity in a controlled manner. Normally, one end of the valve 1 is connected to a mixing zone 4 such as the aforementioned static mixers having helical vanes 5. After traveling through the valve 1 and static mixer 4, the foam is released into the cavity to be filled with foam. The area and direction into which the foam expands can be control and/or defined by using a containment means such as a polymeric bag 6 (the containment means is described below in greater detail).

Referring now to FIG. 2B, this type of arrangement provides a longer mixing time for the foam precursors before the foam is released into the cavity to be filled. The arrangement illustrated in FIG. 2B can also be employed as a cap 10 to seal or define one end of the cavity to be sealed. After delivering the foam precursors, a mix head 11 or previously described valves (4 and 5 of FIG. 2A). The foam precursors travel through mix head 11 and are released at the opening defined at 12 as foam. The opening 12 can also be within the aforementioned containment means. The caps 1 and 10 can remain associated with the foam product within the cavity. By using such a replaceable mix head, any problems associated with clogged mix heads are avoided. Two pressure streams can also be employed, to converge in a mix chamber or cavity to be foamed and mix action occurs without use of additional mixing apparatus. In addition to the foregoing, the inventive foam composition and precursors thereof can be injected, extruded, shaped, sprayed, cast, molded, among other conventional processes in order to obtain a desirable foam article. The configuration of the foam article can be virtually any shape including continuous shapes such as films or webs, discrete forms, among other shapes.

While the above description emphasizes particular foam compositions, the inventive compositions (and precursors thereof) can include additives such as dyes, fillers, surfactants, pigments, nucleating agents, among other conventional employed foam additives. If desired a pH indicator can be added to the precursor in order to provide a visual detection means for a reaction product. An example of a suitable pH indicator comprises at least one member selected from the group consisting of methyl red, methyl blue, chlorophenol red, bromothymol blue. That is, as the foam precursor react, e.g, acid-epoxy, the acid is consumed thereby changing the pH and causing the pH indicator to change color.

If desired, the inventive composition can be laminated or joined with other articles, e.g., laminated onto metal foil, Mylar, fiberboard, veneer, Formica® etc. In one aspect of the invention, the inventive foam precursors can be applied between two such laminating materials in order to form components that are useful in fabricating furniture. For example, the inventive foam is expanded between two laminating materials, one of which comprises the upper surface (e.g., a wood veneer) and the second the lower surface of a table top. Any excess foam can be removed by conventional methods such as sawing, scraping, etc. The foam imparts structural integrity to the article while reducing weight and fabrication time.

The inventive composition can also be expanded within a control or containment device or bag having a predetermined shape thereby forming a foamed article that replicates the bag, e.g, refer to U.S. Pat. Nos. 4,269,890 (Breitling), 4,232,788 (Roth), 4,390,333 (Dubois); the disclosure of each of which is hereby incorporated by reference. When expanding the foam into a bag, the previously described valves illustrated in FIGS. 2A and B; those supplied commercially by Inflatable Packaging as part no. IP04, or any other suitable delivery means can be employed at the opening in the bag in order to control introduction of the foam into the bag.

For example, a bag replicating a cavity such as an automotive cavity or any other desirable configuration unrolls or expands into the cavity as foam is introduced into the bag via the valve. If desired, the bag may comprise or be coated with a heat sensitive adhesive wherein the heat generated by the exothermic foam reaction activates the adhesive. The adhesive can permanently affix the foam containing bag at any desirable location. The bag can also include predetermined areas having weakened seams or perforations that are designed to rupture as the foam expands thereby directing the expanding foam. Similarly, the bag composition can be selected such that the bag melts when exposed to the foam. The melting bag can direct the expanding foam, form a coating upon the foam, and function as an adhesive, among other utilities. Further, a plurality of bags can be employed wherein one bag is surrounded by another bag. The inner and/or outer bag can possess the aforementioned predetermined properties. Furthermore, the bag can comprise areas having distinct chemical and/or physical properties, e.g., a bag comprising one sheet of polyethylene heat sealed around its periphery to a sheet comprising polybutadiene. At least a portion of the bag can be fabricated from one or members selected from the group consisting of polyethylene, polyester, vinyl, nylon, Surlyn®, ethylene vinyl acetate, styrene-isoprene-styrene, styrene-butadiene-styrene or other blocked copolymers, polybutadiene, among other plastic materials with melt points corresponding to temperature range of reaction, polyamide, modified EVA's, modified polyethylene, modified polybutadiene, GMA, SBR, among other plastic materials suitable for bag or bladder construction and seaming capability. The bag or containment means can be utilized with a wide range of foam compositions in addition to the previously described epoxy containing foams. Examples of foams that can be expanded into the previously described containment bags or means comprise at least one of epoxy amine, acrylic, and phenolic among others.

The foam precursors can be removed from surfaces, equipment, among other articles by employing nonhazardous cleaning materials. An example of suitable cleaning material comprises water, isopropyl alcohol, 2-butoxyethanol and a chelating agent. The cleaning material can be dispensed as an aerosol by using a propellant such as DME, hydrocarbons and carbon dioxide.

Moreover, the inventive foam can be fabricated to possess a substantially uniform or varying density throughout one or more of its dimensions. The ability to tailor foam density in individual articles as well as throughout an article is a marked improvement in the art. Foams having varying densities can be employed for attenuating or focusing sound, various forms of electromagnetic radiation, radar, etc.

While the above description emphasizes a reaction between an epoxy containing compound and one or more acid or hydrogen donor, the inventive method can be achieved by employing other polymer systems such as silicones, urethanes, silanes, hydroxyl or caboxyl modified elastomers; hydroxyl, carboxyl or epoxy functional compounds, reactive liquid polymers such as Hycar®, among others. That is, a polymer system is contacted with an acid that generates an exothermic reaction which in turn activates an expansion or foaming agent.

The following Examples are provided to illustrate not limit the scope of the invention as defined in the appended claims. Unless indicated otherwise, commercially available apparatus and materials were employed in these Examples.

EXAMPLE 1

A foam product was produced by mixing a 2-part system (A-side precursor and B-side precursor) through a conventional foam production apparatus comprising a static mixer that was manufactured by Albion (Model No. 535-1 or equivalent). The constituents of the foam were maintained in two separate supplies of materials, an A-side precursor and B-side precursor.

The A-side precursor comprised a blend of the epoxy and the thermoplastic microspheres including a blowing agent, in ratio of 30 parts to 15 (100 parts total). The B-side precursor comprised a blend of the phosphoric acid and the polyol in a 30 part to 50 part ratio (also 100 parts). The feed ratio of A-side precursor to B-side precursor to the mixer head was 1:1. The pH of the B-side precursors was about 1.6 prior to reaction with A-side precursor.

A pressurized flow through the mixing chamber produced a polymer which rapidly expands and released an amount of exothermic heat sufficient to produce a foam.

EXAMPLE 2

The process of Example 1 was repeated with the exception that the ratio of epoxy to thermoplastic microspheres in A-side precursor was 2:1, and the ratio of phosphoric acid to polyol in B-side precursor was 3:5. The feed ratio of A-side precursor to B-side precursor to the mixer head was 3:1.

EXAMPLE 3

The process of Example 1 was repeated with the exception that the A-side precursor and B-side precursor components were mixed together by hand (instead of using the static mixer).

EXAMPLE 4

This example demonstrates the formation of a composite foam. The process of Example 1 was repeated with the exception that about 5 wt. % polytetrafluoroethylene powder (TEFLON® supplied by the DuPont Company) was added to the A-side precursor composition. The A-side precursor and B-side precursor were contacted in the manner described in Example 1. A composite foam was recovered wherein the composite foam had greater flexibility or pliability in comparison the foam obtained by the process of Example 1.

EXAMPLE 5

A two phase system was used to produce a foam. The A-side precursor was composed of epoxy and microspheres in a 2:1 ratio (67% epoxy, 33.3% microspheres) by weight. (It is noted that for best results, the mix should be used within in 4–8 hours of mixing since certain epoxies can dissolve certain spheres). The A-side precursor was hand-stirred to a smooth consistency.

The B-side precursor was composed of Polyol (Tone 0301) and Phosphoric acid (10%) by weight. The acid was blended into the polyol. A-side precursor to B-side precursor ratio of 1:1 was contacted in a static tube mixer and produced a foam. The ratio of A to B can be from 1:1 to 4:1 depending on acid concentration.

EXAMPLE 6

A two phase system was used to produce a foam. The A-side precursor comprised an of epoxy (UCB-Radcure UVACURE 1500). The B-side precursor was comprised of a polyol (50 wt. %—Tone 0301), phosphoric acid diluted with water (approximately 50% acid in a commercially available solution) at 20%, and 30% microspheres. The spheres were hand-stirred into the polyol to a smooth consistency. The acid mixture was blended by hand-stirred into the sphere-polyol mix. An A-side precursor to B-side precursor ratio of 1:1 was contacted in a static tube mixer and produced a foam. The ratio of A to B can be from 1:1 to 4:1 depending on acid concentration.

EXAMPLE 7

A two phase system was used to produce a foam. The A-side precursor comprised an epoxy (UCB-Radcure UVACure1500) While the B-side precursor comprised polyol (Tone 0301), polyvinyl alcohol and water blend (PVOH:H20 3:1 blend that corresponded to 20% of the polyol) and microspheres 30% by weight of polyol and acid can be 10% of total 'B' mixture. The spheres were hand-stirred into the polyol to a smooth consistency. The PVOH and water are hand-stirred. The PVOH/water solution temperature was 140° F. The PVOH blend was added to the polyol by hand stirring. The acid was hand-stirred into the sphere-PVOH-polyol mix. The A-side precursor to B-side precursor ratio of 1:1 was contacted in a static tube mixer and produced a foam. The ratio of A to B can be from 1:1 to 4:1 depending upon acid concentration.

EXAMPLE 8

A two phase system was used to produce a foam. The A-side precursor comprised an epoxy (UCB-Radcure UVA-Cure 1500) and a phenoxy resin (Paphen PKHP-200 that corresponded to 25% of A-side precursors, epoxy is 75% of A-side precursors). The B-side precursor comprised 45% polyol (Tone 0301), 23.5% polyvinyl alcohol (Airvol 203S) and 23.5% microspheres. Phosphoric acid was 10% by wt. of the B-side precursor. Spheres are hand-stirred into the polyol to a smooth consistency. The PVOH, microspheres, and polyol are blended by hand stirring. The phosphoric acid was hand-stirred into the sphere-PVOH-polyol mix. An A-side precursor to B-side precursor ratio of 1:1 was used contacted in a static tube mixer to produce a foam. The A to B ratio can range from 1:1 to 4:1 depending on acid concentration.

EXAMPLE 9A

A two phase system, namely an A-side precursor and a B-side precursor, was used to produce a foam. The A-side precursor comprised an epoxy (UCB-Radcure UVACure 1500) 60 wt %, polypropylene powder (Equistar FP 800-00) 20 wt %, polyvinyl alcohol (Airvol 203S) 20 wt %. The B-side precursor comprised polyol (Tone 0301) 60 wt % and microspheres 30%. Phosphoric acid was 10%. Spheres are hand-stirred into the polyol until a smooth consistency was obtained. The microspheres and polyol are blended by hand stirring. The phosphoric acid was hand-stirred into the microspheres and polyol mix. An A-side precursor to B-side precursor ratio of 1:1 was used and contacted in a static tube mixer to produce a foam. The A to B ratio can, however, range from 1:1 to 4:1 depending on acid concentration.

EXAMPLE 9B

This Example employed a two phase system wherein the A-side precursor comprised a gel. A two phase system, namely an A-side precursor and B-side precursor, was used to produce a foam. The A-side precursor comprised an epoxy (UCB-Radcure UVACure 1500) 59 wt %, polypropylene powder (Equistar FP 800-00) 20 wt %, polyvinyl alcohol (Airvol 203S) 20 wt % and surfactant (gelling agent) at 1 wt %. The B-side precursor comprised polyol (Tone 0301) 60 wt % and microspheres 30%. Phosphoric acid was 10%. Spheres are hand-stirred into the polyol until a smooth consistency was obtained. The microspheres and polyol are blended by hand stirring. The phosphoric acid was hand-stirred into the microspheres and polyol mix. An A-side precursor to B-side precursor ratio of 1:1 was used and contacted in a static tube mixer to produce a foam. The A to B ratio can, however, range from 1:1 to 4:1 depending on acid concentration.

EXAMPLE 10

A bag or containment device approximately 8×8 inches in size and having a one-way valve located on one end of the bag was constructed from two sheets of high density polyethylene film. The seams of the bag were designed to rupture at specific locations, which directs foam expansion into cavity area adjacent to weak seams. The sheets were joined by heating on a TEW Electric Heating Company Ltd sealing apparatus. The seams were selectively reinforced by double sealing or weakened to provide multiple points for foam direction from the same bag. The foam composition demonstrated by Example 9 was introduced into this bag. As the foam expanded, the foam escaped from the bag through the relatively weak seams.

EXAMPLE 11

A bag or bladder composed of each of polyethylene, ethylene vinyl acetate, polybutadiene were fabricated by using the apparatus described in Example 10. The foam of Example 9 was introduced into these bags. The bags, having a melting point less than the exothermic reaction temperature of the foam, failed and released the foam.

EXAMPLE 12

A bag or bladder composed of each of modified EVA (Bynel®), modified polyethylene (Primacor® supplied by Dow Chemical Company), modified butadiene, glycidal methacrylate (GMA) were fabricated by using the apparatus of Example 10. The foam of Example 9 was introduced into these bags. The heat released from the exothermic reaction of the foam caused the bags to melt. The melting bag material adhered to the foam thereby modifying the surface of the foam. The melting bag also adhered the foam to any surrounding surfaces or articles.

EXAMPLE 13

A bag or bladder composed of each of polypropylene, polyethylene, woven nylon mesh, aluminized fiberglass mesh was fabricated by using the apparatus of Example 10. Each of the bags was further processed to possess multiple perforations (25–100 holes/in.). The foam of Example 9 was introduced into each of these bags. The perforations allowed the foam to escape in controlled quantities while also generally retaining the shape of the bag.

EXAMPLE 14

Two bags or bladders, namely an inner and outer bag were fabricated by using the apparatus of Example 10. The inner bag comprised modified butadiene and the outer bag comprised high density polyethylene. The inner bag was placed within the outer bag and the outer bag was sealed. The foam of Example 9 was introduced into the inner bag. Inner bag or bladder melted during the foam reaction. The inner bag was of sufficient size to contain the required amount of mixed foam precursors to fill the out bag. Outer bag construction was of material and size to contain reaction within the cavity.

EXAMPLE 15

The insertion loss or sound dampening characteristics of the foam produced in accordance with Example 9A was tested in accordance with Society of Automotive Engineers (SAE) J 1400. The sample size was 3×3×10 inches and placed within an E-coated metal channel. An increase in insertion loss corresponds to an increase in sound dampening properties that in turn corresponds to less noise within the passenger compartment of an automobile.

| FREQ. (Hz) | INSERTION LOSS (dB) |
|---|---|
| 125 | 12.5 |
| 160 | 10.6 |
| 200 | 11.4 |
| 250 | 12.0 |
| 315 | 24.5 |
| 400 | 35.4 |
| 500 | 46.8 |
| 630 | 38.4 |
| 800 | 40.1 |
| 1000 | 45.7 |
| 1250 | 45.1 |
| 1600 | 49.6 |
| 2000 | 49.2 |
| 2500 | 50.1 |
| 3150 | 50.9 |
| 4000 | 55.5 |
| 5000 | 58.7 |
| 6300 | 59.2 |
| 8000 | 64.2 |

These data illustrate the desirable sound absorbing characteristics of the inventive foam compositions.

EXAMPLE 16

The viscosity of the Part A foam precursor fabricated in accordance with Example 9A was tested in accordance with conventional methods and apparatus (Brookfield Viscometer, Spindle 27, Thermal-Cell). The viscosity as a function of temperature is listed below.

| RPM | Temp 75 F. | Temp 110 F. | Temp 150 F. |
|---|---|---|---|
| 0.5 | 13,000 | 8,000 | 3,000 |
| 1 | 10,500 | 5,500 | 2,500 |
| 2.5 | 8,160 | 3,400 | 1,600 |
| 5 | 6,680 | 2,300 | 1,100 |
| 10 | 5,700 | 1,800 | 800 |
| 20 | 4,830 | 1,480 | 600 |
| 50 | 3,900 | 1,250 | 468 |
| 100 | 3,280 | 1,100 | 404 |

The viscosity of the Part B foam precursor fabricated in accordance with Example 9A was tested in accordance with conventional methods and apparatus (Brookfield Viscometer, Spindle 27, Thermal-Cell). The viscosity as a function of temperature is listed below.

| RPM | Temp 75 F. | Temp 110 F. | Temp 150 F. |
|---|---|---|---|
| 0.5 | 22,000 | 13,000 | 4,000 |
| 1 | 20,000 | 10,000 | 2,500 |
| 2.5 | 18,600 | 7,000 | 1,600 |
| 5 | 17,800 | 5,320 | 1,300 |
| 10 | 17,300 | 4,500 | 1,100 |
| 20 | | 4,000 | 975 |
| 50 | | 3,700 | 880 |
| 100 | | 3,580 | 860 |

EXAMPLE 17

This Example illustrates foam formation as a result of being activated by exposure to an energy source, e.g, UV light. A radiation curable foam having the following components was prepared:

| COMPONENT | TRADE NAME | SUPPLIER | AMOUNT |
|---|---|---|---|
| Cycloaliphatic epoxy | UVACURE 1500 | Radcure | 50 wt. % |
| Caprolactone polyol | Tone 0301 | Union Carbide | 40 |
| Blowing agent | Expancel DU551 | Expancel Inc. | 9 |
| Sulfonium salt | UVI-6974 | Union Carbide | 1 |

The above components were combined as follows. The Uvacure and polyol were added together in a mixing vessel and mixed until the solution was clear. The UVI 6974 was added to the mixture, and mixed until substantially completely dispersed (about 2 minutes). The Expancels spheres were added to the mixture and mixed until substantially lump free. For best results, the minimum amount of mixing time, and shear were employed.

The foam precursors were placed onto a conveyor and exposed to a source of UV light. The method for exposing the precursors to UV light is described in the previously identified U.S. patent application Ser. No. 09/197,107, filed Nov. 20, 1999, both filed in the name of Jeffrey Pachl et al., and entitled "Curable Sealant Composition".

This UV activated foam was modified by adding an acrylic monomer or acrylated oligomer. This modified LTV activated foam was prepared as described above and comprised:

| COMPONENT | TRADE NAME | SUPPLIER | AMOUNT |
|---|---|---|---|
| Acrylated oligomer | IRR 84 | UCB RADCURE | 93.5 wt. % |
| Acid functional Oligomer | Ebecryl 170 | UCB RADCURE | 0.9 |
| Photo-initiator | Darocure 1173 | Ciba-Giegy | 0.9 |
| Blowing Agent | F30D-Micropearls | Pierce & Stevens | 4.7 |

The resultant foam possessed a pressure sensitive adhesive characteristic. The tacky pressure sensitive characteristic was removed by adding an acrylate compound. A tack-free formulation comprised:

| COMPONENT | TRADE NAME | SUPPLIER | AMOUNT |
|---|---|---|---|
| Acrylated oligomer | IRR 84 | UCB RADCURE | 92.6 wt. % |
| Acid functional Oligomer | Ebecure 170 | UCB RADCURE | 0.9 |
| Photo-initiator | Darocure 1173 | Ciba-Giegy | 0.9 |
| Blowing Agent | F30D-Micropearls | Pierce & Stevens | 4.7 |
| Acrylate | Sartomer 444 | Sartomer | 0.9 |

The later two formulations were also activated by being exposed to natural light.

EXAMPLES 18–22 AND 25

The following Table lists the Components, Trade Names and Suppliers for the foam precursors that were employed in Examples 18 through 22 and 25. The foam in Examples 18–22 was prepared by contacting the Part A with the Part B listed in the tables below in a 2.75" diameter by 1.92"

height ointment can and mixed by hand. Reaction Time and Temperature were determined in accordance with conventional methods. The percent vertical expansion as well as the shrinkage was determined visually. The Shore A test was conducted using a Type A-2 Shore Durometer Hardness test unit that meets ASTM D2240 requirements. The Shore A test was conducted about 4 hours after foam formation. The instantaneous peak reading was recorded.

| Trade Name | | Component | Supplier |
|---|---|---|---|
| Epon 862 | | Bis F/Epichlorohydrin Epoxy Resin | .Shell Chemical Co. |
| Expancel 091DU80 | (244F) | Blowing Agent (thermal) | Expancel, Inc |
| Expancel 051DU | (223F) | Blowing Agent (thermal): 2-methyl 2-propenoic acid methyl ester polymer with 2-propenenitrile and isobutane is the blowing agent | Expancel, Inc. |
| Expancel 054WU | (257F) | Blowing Agent (thermal): 2-methyl 2-propenoic acid methyl ester polymer with 2-propenenitrile and isopentane is the blowing agent | Expancel, Inc. |
| Expancel 461DU | (208F) | Blowing Agent (thermal): 2-methyl 2-propenoic acid methyl ester polymer with 1,1-dichloroethene and 2-propenenitrile and isobutane is the blowing agent | Expancel, Inc. |
| Expancel 551WU | (199F) | Blowing Agent (thermal): 2-methyl 2-propenoic acid methyl ester polymer with 1,1-dichloroethene and 2-propenenitrile and isobutane is the blowing agent | Expancel, Inc. |
| Expancel 551WU80 | | Blowing Agent (thermal): 2-methyl 2-propenoic acid methyl ester polymer with 1,1-dichloroethene and 2-propenenitrile and isobutane is the blowing agent | Expancel, Inc. |
| Expancel 642WU | (183F) | Blowing Agent (thermal): 2-methyl 2-propenoic acid methyl ester polymer with 1,1-dichloroethene and 2-propenenitrile and isobutane is the blowing agent | Expancel, Inc. |
| Expancel 820DU | (167F) | Blowing Agent (thermal): 2-methyl 2-propenoic acid methyl ester polymer with 1,1-dichloroethene and 2-propenenitrile and isobutane is the blowing agent | Expancel, Inc. |
| Expancel 820WU | (167F) | Blowing Agent (thermal): 2-methyl 2-propenoic acid methyl ester polymer with 1,1-dichloroethene and 2-propenenitrile and isobutane is the blowing agent | Expancel, Inc. |
| Heloxy 505 | | Epichlorohydrin Castor Oil Based Epoxy Resin (aliphatic triglyceride triglycidyl ether) | Shell Chemical Co. |
| SR 239 | | 1,6 Hexanediol Dimethacrylate | Sartomer |
| SR 495 | | Caprolactone Acrylate | Sartomer |
| Vertrel XF | | Blowing Agent: 2,3-Dihydroperfluoropentane (Pentane,1,1,1,2,3,4,4,5,5,5-decafluoro: CF3CHFCHFCF2CF3) | DuPont |
| Micropearls F30D | | Blowing Agent (thermal): isobutane encapsulated in polymer vinylidene chloride | HM Royal (Pierce & Stevens) |
| Ebecryl 170 | | Adhesion Promoter: Acrylate modified acidic adhesion promoting agent | UCB Radcure |
| Amicure CG1400 | | Dicyandiamide | Air Products |
| Glycolic Acid (70% Tech) | | Technical grade (70%) | DuPont |
| $H_3PO_4$ (>95% conc.) | | concentrated grade via distillation of the 75% technical grade from Harcros Chemical | DeNOVUS |
| HQ54 | | merchant grade (73%) | PCS |
| Amberphos-54 (AMMGA) | | merchant grade (75%) | PCS |
| $H_3PO_4$ (85% Reagent) | | reagent grade (85%) | Fischer Scientific |
| $H_3PO_4$ (75% technical) | | technical grade (75%) | Harcros Chemicals |
| $H_3PO_4$ (85% technical) | | technical grade (85%) | FMC/Harcros Chemicals |
| BTL 71001 | | Elastomer: EVA powder | BTLSR Toledo |
| MU 760-00 | | Elastomer: EVA powder: MI = 23: MP = 187 F: VA = 19: Particle Size = 35 mesh | Equistar |
| Microthene FA 700-00 | | Elastomer: HDPE powder: MI = 10.5: MP = 273 F: Particle Size = 20 microns | Millennium |
| Microthene FN 514-00 | | Elastomer: LDPE powder: MI = 70: MP = 216 F: Particle Size = 20 microns | Millennium |
| Microthene FP 800-00 | | Elastomer: Polypropylene powder: MP = 325 F: Particle Size = 20 microns | Equistar |
| LIR 403 | | Elastomer: Rubber: (polyisoprene liquid rubber) | Kuraray Co |
| Kraton D1107 | | Elastomer: SIS rubber pellets | Shell Chemical Co |
| Q325 | | Calcium carbonate | JM Huber Corp |
| Quikrete | | Concrete mix | Quikrete Co. |
| Dicaperl CS-10-200 | | Hollow ceramic spheres | Grefco Inc |
| Qcel 650-D | | Inorganic microspheres | PQ Corporation |

-continued

| Trade Name | Component | Supplier |
|---|---|---|
| SynPro Li Stearate | Li stearate | Ferro |
| A-C 6702 | Oxidized polyethylene | Allied Signal |
| Airvol 203S | Polyvinyl Alcohol (PVOH) | Air Products |
| G | Sodium silicate | PQ Corporation |
| BTL 74001 | Versatic acid ester/polyvinyl acetate ester | BTLSR Toledo |
| AZO 77 | Zinc oxide | Morton Meyer |
| Isopropyl Alcohol (70%) | Alcohol | Commercial |
| Ethanol | Alcohol: Pure Grain Alcohol | Commercial |
| Ircosperse 2174 | Dispersant | Lubrizol |
| Carbopol EZ-1 | Emulsion Thickener | BF Goodrich |
| #1 Castor Oil | Oil | Acme-Hardesty |
| Lucant HC-2000 | Oil: Hydrocarbon based synthetic oil | Mitsui Chemical |
| Vasoline | Petroleum Jelly | Chesebrough-Ponds |
| Indopol L100 | Polybutene | Amoco |
| Unifilm 100HSM | Rheology Control Agent | Troy Chemical |
| Z6040 | Silane | Dow Corning |
| Z6124 | Silane: Arylalkoxy silane | Dow Corning |
| Dish Soap | Soap | Commercial |
| Boraxo | Soap: Sedium tetraborax decahydrate | Dial Corp |
| Triton X45 | Surfactant | Union Carbide |
| Texaphor Special | Surfactant: Anionic Surfactant | Henkel |
| KRTTS | Titanate | Kenrich |
| Santolink XI-100 | Allyl glycidyl ether alcohol resin | Solutia/Monsanto |
| SB 400 | Aromatic acid methacrylate-mixed half ester | Sartomer |
| Pliolite AC | Copolymer: (styrene-acrylate: powder) | Goodyear |
| Pliolite S-5A | Copolymer: (styrene-butadiene: powder) | Goodyear |
| CMD 50859 | Epoxy: | Shell Chemical Co |
| CMD 8750 | Epoxy: | Shell Chemical Co |
| PEP 6180 | Epoxy: (epoxy toughener: hydrogenated Bis A:) | Pacific Epoxy |
| PEP 6210 PA | Epoxy: (epoxy toughener: polyether adduct, epoxy functionality: EEW = 210: visc = 500 cps) | Pacific Epoxy |
| Erisys GE-60 | Epoxy: (sorbitol glycidyl ether - aliphatic polyfunctional epoxy): liquid: EEW = 170: visc = 13,000 cps | CVC Specialty Chemicals |
| Epalloy 5000 | Epoxy: Bis A: (epoxidized hydrogenated Bis A resin): EEW = 220: visc = 1900 cps | CVC Specialty Chemicals |
| DER 317 | Epoxy: Bis A: liquid | Dow Chemical |
| DER 331 | Epoxy: Bis A: liquid | Dow Chemical |
| DER 736 | Epoxy: Bis A: liquid | Dow Chemical |
| Epon 828 | Epoxy: Bis A: liquid | Shell |
| Uvacure 1500 | Epoxy: cycloaliphatic | UCB Radcure |
| Uvacure 1502 | Epoxy: cycloaliphatic | UCB Radcure |
| Uvacure 1533 | Epoxy: cycloaliphatic | UCB Radcure |
| Cryacure UVR 6128 | Epoxy: cycloaliphatic | Union Carbide |
| K126 | Epoxy: cycloaliphatic: (cycloaliphatic diepoxide) | Sartomer |
| Eponex 1510 | Epoxy: cycloaliphatic: (cycloaliphatic glycidyl ether): (hydrogenated DGEBPA) | Shell Chemical Co |
| Erisys GE-22 | Epoxy: cycloaliphatic: (difunctional cycloaliphatic): (cyclohexanedimethanol diglycidyl ether): EEW = 155: visc = 60 cps | CVC Specialty Chemicals |
| Uvacure 1534 | Epoxy: cycloaliphatic: cycloaliphatic epoxy-polyol blend | UCB Radcure |
| Erisys GE-35 | Epoxy: Glycidyl ether of castor oil | CVC Specialty Chemicals |
| Epon SU2.5 | Epoxy: Novolac | Shell |
| Epalloy 8240 | Epoxy: Novolac: (epoxidized phenol novolac: liquid): EEW = 170: visc = 6550 cps: fnc = 2.35 | CVC Specialty Chemicals |
| Epon 58005 | Epoxy: rubber modified: (40% CTBN) | BF Goodrich |
| Erisys EMRM-22 | Epoxy: rubber modified: (CTBN modified epoxy) | CVC Specialty Chemicals |
| Tone EC | Monomer: Lactone: 2-oxepanone (6-hydroxyhexanoic acid-e-lactone) | Union Carbide |
| Santicizer 261 | Plasticizer: Alkyl Benzyl Phthalate | Solutia |
| Santicizer 278 | Plasticizer: Alkyl Benzyl Phthalate | Solutia |
| Santicizer 160 | Plasticizer: Butyl Benzyl Phthalate | Solutia |
| Santicizer 97 | Plasticizer: Dialkyl Adipate | Solutia |
| Santicizer 141 | Plasticizer: Flame Retardant: 2-ethyl Diphenyl Phosphate | Solutia |
| CAPA 316 | Polyol | Solvay Interox Ltd |
| Tone 0201 | Polyol: (caprolactone-based polyol: diol): Hydroxyl # = 212: | Union Carbide |
| Tone 0301 | Polyol: (caprolactone-based polyol: triol): Hydroxyl # = 560: visc-225 @ 55 C | Union Carbide |

-continued

| Trade Name | Component | Supplier |
|---|---|---|
| Arcol E-351 | Polyol: (polyether polyol: capped diol): Hydroxyl # = 40: visc = 507 Cp | Arco Chemical Co |
| Arcol DP-1022 | Polyol: (polyether polyol: diol): Hydroxyl # = 1200: visc = 175 cP | Arco Chemical Co |
| PPG-425 | Polyol: (polyether polyol: diol): Hydroxyl # = 263: visc = 71 cps | Arco Chemical Co |
| Acclaim Polyol 4220 | Polyol: (polyether polyol: monol diol): | Arco Chemical Co |
| Acclaim Polyol 6300 | Polyol: (polyether polyol: monol triol): Hydroxyl # = 28: visc = 1452 cP: fnc = 2.94: acid value = 0.01 | Arco Chemical Co |
| Arcol LG-650 | Polyol: (polyether polyol: triol): Hydroxyl # = 650: visc = 1059 cP | Arco Chemical Co |
| Ebecryl 81 | Polyol: Modified polyester polyol | Radcure |
| K-Flex 188 | Polyol: Polyester Polyol: | King Industries |
| Desmophen L-951 | Polyol: Short chained polyol: Hydroxyl # = 265 | Bayer |
| Hycar 1300x40 | Rubber | BF Goodrich |
| Hycar 1300X13 | Rubber: (CTBN acrylonitrile liquid rubber) | BF Goodrich |
| Nipol 1312 | Rubber: (liquid nitrile rubber) | Zeon Chemical |
| CN 301 | Rubber: (methacrylated polybutadiene) | Sartomer |
| R45HT | Rubber: (PBD hydroxyl terminated) | Elf Atochem |
| Actipol E-16 | Rubber: Activated polybutene: (Epoxidized polybutene): Liquid | Amoco |
| Trilene M-101 | Rubber: Epoxidized EPDM | Uniroyal |
| PBD 605 | Rubber: Hydroxyl terminated PBD | Elf Atochem |
| Kraton L-2203 | Rubber: Hydroxyl terminated poly (ethylene/butylene) polymer: Diol | Shell Chemical Co |
| Ricon 100 | Rubber: Styrene PBD: Liquid | Ricon Resins |
| Ricon 184 | Rubber: Styrene PBD: Liquid | Ricon Resins |
| SAT 010 | Silyl | Kaneka |
| SAT 030 | Silyl | Kaneka |
| SAT 200 | Silyl | Kaneka |
| Vertrel XF | 2,3-Dyhydroperfluoropentane (Pentane, 1,1,1,2,3,4,4,5,5,5-decafluoro: CF3CHFCJFCF2CF3) | DuPont |
| Micropearls F30D | Thermal Blowing Agent: isobutane encapsulated in polymer vinylidene chloride | HM Royal (Pierce & Stevens) |

The following terms and definitions are referenced in Examples 18–22.

Tin Ointment Can: Dimensions 2.75" d×1.92" h

Initial Rxn Time: Time that initial expansion is observed (includes mix time, does not include time to pour part A into part B Final Rxn Time: Time for reaction to go to completion (includes "Initial Rxn Time")

Rxn Temp: The peak temperature observed during the reaction

% Ht Expansion: % $HE=[(h_f-h_i)/h_i]\times 100$

Density: Weight of 1 in$^3$ block of expanded material (g/in$^3$)

$H_2O$ Absorption 1: $100\times(W_3-W_2)/(W_2-W_C)$: $W_C$=weight of aluminum coupon only $W_2$=weight of coupon+material before submerging in water $W_3$=weight of coupon+material after submerging in water: Mix material, apply to a 3"×3" aluminum coupon, allow to cool to room temperature, submerge in water for 24 hrs, wipe off excess and immediately calculate water absorption.

$H_2O$ Absorption 2: Take a 1.5 inner diameter×h Polyvinyl chloride (PVC) pipe: use Daubert #2-76GSM paper as the release liner inside the PVC pipe (use some means to cap the bottom so that material does not exude out): mix part A & B and pour into the pipe and allow to expand and cure: cool to room temperature: cut 1.5" lengths so that the sample size is ≈1.5"d×1.5"h: sand the edges: submerge in water for 24 hrs: remove the sample, wipe off excess water and immediately calculate % water absorption. % Water Absorption=100× $(W_F-W_1)/W_1$ $H_2O$ Absorption 3: "Open Chunk": Mix part A & B in a polystyrene plastic cup: allow to expand and cure: cool to room temperature: Cut a "chunk" of foam from the top surface: submerge in water for 24 hrs: remove the sample, wipe off excess water and immediately calculate % water absorption: % Water Absorption=100× $(W_F W_1)/W_1$ Hardness: Shore A: The foam surface may be irregular: Take highest instantaneous reading from top surface after conditioning at room temperature for 4 hrs minimum Shrinkage: Rating: 0=none 1=<1 mm from edge 2=1–2 mm from edge 3=2–3 mm from edge 4=3–4 mm from edge 5=4–5 mm from edge 6=5–6 mm from edge (shrinkage is usually not symmetrical: take the largest gap and divide by 2 if it did not shrink equally from the outer perimeter. Other values listed will be visually results: Rating 1=very slight, Rating 2=noticeable, Rating 3 & 4=significant, Rating 5 & 6=very significant

EXAMPLE 18

| Components Wt. % | SAMPLE NO | | | | | | | | |
|---|---|---|---|---|---|---|---|---|---|
| | 1 | 2 | 3 | 4 | 5 | 6 | 7 | 8 | 9 |
| Part A | | | | | | | | | |
| Uvacure 1500 | 30 | 30 | 30 | 30 | 30 | 30 | 20 | 30 | 30 |
| Microthene FP800-00 | 10 | 10 | 10 | 10 | | 10 | 10 | 10 | |
| Airvol 203 S (PVOH) | 10 | 10 | 10 | 10 | 10 | 10 | 10 | 10 | 10 |
| Dicaperl CS-10-200 | | | | | 10 | | | | |
| Hycar 1300x13 | | | | | | 10 | | | |
| PEP 6180 | | | | | | | 10 | | 5 |
| Part B | | | | | | | | | |
| Tone 0301 (Polyol) | 29.65 | 29.65 | 29.65 | 29.65 | 29.65 | 29.65 | 29.65 | 29.65 | 29.65 |
| Micropearls F30D | 14.85 | 10 | 12 | 16 | 14.85 | 14.85 | 14.85 | 14.85 | 14.85 |
| H$_3$PO$_4$ (Reagent: 85%) | 5.5 | 5.5 | 5.5 | 5.5 | 5.5 | 5.5 | 5.5 | 5.5 | 5.5 |
| Rxn Time | 59 sec | 57 sec | 56 | 57 sec | 53 sec | 65 sec | 64 sec | 58 sec | 61 sec |
| Rxn Temp | 288 F. | 291 F. | 289 F. | 265 F. | 292 F. | 265 F. | 238 F. | 289 F. | 270 F. |
| % Vertical Expansion | 487% | 413% | 434% | 468% | 482% | 385% | 205% | 404% | 528% |
| Hardness - Shore A | 20 | 19 | 20 | 21 | 17 | 22 | 23 | 26 | 18 |
| Shrinkage | None | None | None | None | Very Slight | Noticeable | Noticeable | Very Slight | Very Slight |

| Components Wt. % | SAMPLE NO | | | | | | | | |
|---|---|---|---|---|---|---|---|---|---|
| | 10 | 11 | 12 | 13 | 14 | 15 | 16 | 17 | 18 |
| Part A | | | | | | | | | |
| Uvacure 1500 | 30 | 30 | 20 | 30 | 30 | 30 | 30 | 30 | 15 |
| Microthene FP800-00 | | | 10 | 10 | | | | | 10 |
| Airvol 203 S (PVOH) | 20 | 10 | 10 | 10 | 10 | 10 | 10 | 10 | 10 |
| Microthene FN514-00 | | 10 | | | 10 | | | | |
| DER 317 | | | 10 | | | | | | |
| Microthene FA700-00 | | | | | 10 | | | | |
| Equistar MU 76000 | | | | | | 10 | | | |
| AC 6702 | | | | | | | 10 | | |
| BTL 71001 | | | | | | | | 10 | |
| Cryacure UVR 6128 | | | | | | | | | 15 |
| Part B | | | | | | | | | |
| Tone 0301 (Polyol) | 29.65 | 29.65 | 29.65 | 20 | 29.65 | 29.65 | 29.65 | 29.65 | 29.65 |
| Micropearls F30D | 14.85 | 14.85 | 14.85 | 14.85 | 14.85 | 14.85 | 14.85 | 14.85 | 14.85 |
| H$_3$PO$_4$ (Reagent: 85%) | 5.5 | 5.5 | 5.5 | 5.5 | 5.5 | 5.5 | 5.5 | 5.5 | 5.5 |
| CN 301 | | | | 9.65 | | | | | |
| Rxn Time | 55 sec | 50 sec | 56 | 40 sec | 51 sec | 55 sec | 50 sec | 49 sec | 56 sec |
| Rxn Temp | 276 F. | 274 F. | 242 F. | 268 F. | 277 F. | 271 F. | 280 F. | 292 F. | 259 F. |
| % Vertical Expansion | 494% | 396% | 226% | 361% | 388% | 406% | 415% | 519% | 326% |
| Hardness - Shore A | 16 | 23 | 22 | 42 | 22 | 19 | | 19 | 15 |
| Shrinkage | None | Very Slight | Very Slight | Very Slight | Very Slight | Very Slight | Very Slight | None | Very Slight |

| Components Wt. % | SAMPLE NO | | | | | | | | |
|---|---|---|---|---|---|---|---|---|---|
| | 19 | 20 | 21 | 22 | 23 | 24 | 25 | 26 | 27 |
| Part A | | | | | | | | | |
| Uvacure 1500 | 30 | 30 | 30 | 30 | 30 | 30 | 20 | 30 | 30 |

-continued

| Components | | | | | | | | | |
|---|---|---|---|---|---|---|---|---|---|
| Microthene FP800-00 | 10 | 10 | 10 | 10 | 10 | 10 | 10 | 10 | |
| Airvol 203 S (PVOH) | 10 | | 10 | 10 | 10 | 10 | 10 | 10 | 10 |
| Quickrete Concrete Mix | | 20 | | | | | | | |
| DER 331 | | | | | 10 | | | | |
| Epalloy 8240 | | | | | | | 10 | | |
| Q325 | | | | | | | | | 10 |
| Part B | | | | | | | | | |
| Tone 0301 (Polyol) | 29.65 | 29.65 | 29.65 | 29.65 | 29.65 | | 29.65 | 29.65 | 29.65 |
| Micropearls F30D | | 14.85 | | | 14.85 | 14.85 | 14.85 | | 14.85 |
| H$_3$PO$_4$ (Reagent: 85%) | 8 | 5.5 | 5.5 | 5.5 | 5.5 | 5.5 | 5.5 | 5.5 | 5.5 |
| Acclaim 6300 | | | | | | 29.65 | | | |
| Expancel 091DU80 | 14.85 | | | | | | | | |
| Expancel 642WU | | | 14.85 | 14.85 | | | | | |
| Expancel 051DU | | | | | | | | 7.5 | |
| Rxn Time | | 52 sec | 55 sec | 52 sec | 54 sec | 46 sec | 55 sec | 72 sec | 50 sec |
| Rxn Temp | 298 F. | 282 F. | 289 F. | 285 F. | 270 F. | | 278 F. | 323 F. | 274 F. |
| % Vertical Expansion | 183% | 282% | 460% | 450% | 378% | 206% | 388% | 219% | 570% |
| Hardness - Shore A | 75 | 18 | 10 | 12 | 43 | 23 | 39 | 53 | 21 |
| Shrinkage | None | Very Slight | Very Slight | None | Noticeable | None | Noticeable | Very Slight | Noticeable |

| Components | SAMPLE NO | | | | | | | | |
|---|---|---|---|---|---|---|---|---|---|
| Wt. % | 28 | 29 | 30 | 31 | 32 | 33 | 34 | 35 | 36 |
| Part A | | | | | | | | | |
| Uvacure 1500 | | 30 | 30 | 30 | 30 | 30 | 30 | 30 | 30 |
| Microthene FP800-00 | 10 | 10 | 10 | 10 | | | 10 | 10 | 10 |
| Airvol 203 S (PVOH) | 10 | 10 | 10 | 10 | 10 | 10 | 10 | 10 | 10 |
| Sartomer K126 | 30 | | | | | | | | |
| Epon 58005 | | | 10 | | | | | | |
| DER 736 | | | | 10 | | | | | |
| Sodium Silicate | | | | | 10 | | | | |
| Q Cel 650-D | | | | | | 10 | | | |
| Texaphor Special | | | | | | | 4 | | |
| Blue Dish Wish Soap | | | | | | | | 2 | |
| Part B | | | | | | | | | |
| Tone 0301 (Polyol) | 29.65 | 29.65 | 29.65 | 29.65 | 29.65 | 29.65 | 29.65 | 29.65 | |
| Micropearls F30D | 14.85 | | 14.85 | 14.85 | 14.85 | 14.85 | 14.85 | 14.85 | 14.85 |
| H$_3$PO$_4$ (Reagent: 85%) | 5.5 | 5.5 | 5.5 | 5.5 | 5.5 | 5.5 | 5.5 | 5.5 | 5.5 |
| Expancel 820DU | | 14.85 | | | | | | | |
| E-351 Polyol | | | | | | | | | 29.65 |
| Rxn Time | 50 sec | 50 sec | 54 sec | 61 sec | 58 sec | 49 sec | 68 sec | 71 sec | 40 sec |
| Rxn Temp | 285 F. | 296 F. | 273% | 271 F. | | 294 F. | | 281 F. | 295 F. |
| % Vertical Expansion | 483% | 410% | 396% | 374% | 410% | 445% | 530% | 502% | 302% |
| Hardness - Shore A | 20 | 32 | 34 | 30 | 10 | 18 | 13 | 23 | 38 |
| Shrinkage | None | Noticeable | Noticeable | Significant | Significant | None | Very Slight | None | None |

| Components | SAMPLE NO | | | | | | | | |
|---|---|---|---|---|---|---|---|---|---|
| Wt. % | 37 | 38 | 39 | 40 | 41 | 42 | 43 | 44 | 45 |
| Part A | | | | | | | | | |
| Uvacure 1500 | 30 | 30 | 30 | 30 | 30 | | 30 | 30 | 25 |

-continued

| | | | | | | | | | |
|---|---|---|---|---|---|---|---|---|---|
| Microthene FP800-00 | 10 | 10 | 10 | 10 | 10 | 10 | 10 | 10 | 10 |
| Airvol 203 S (PVOH) | 10 | 10 | 10 | | 10 | 10 | 10 | 10 | 10 |
| Shell CMD 50809 | | | 5 | | | | | | |
| Z6124 | | | | 2 | | | | | |
| Uvacure 1502 | | | | | | 30 | | | |
| Expancel 461DU | | | | | | | | 14.85 | |
| Epon 1510 | | | | | | | | | 5 |
| Part B | | | | | | | | | |
| Tone 0301 (Polyol) | | | 29.65 | 29.65 | 29.65 | 29.65 | 14.65 | 29.65 | 29.65 |
| Micropearls F30D | 14.85 | 14.85 | 14.85 | 14.85 | 14.85 | 14.85 | 14.85 | | 14.85 |
| $H_3PO_4$ (Reagent: 85%) | 5.5 | 5.5 | 5.5 | 5.5 | 5.5 | 5.5 | | | |
| Sartomer SB 400 | 29.65 | | | | | | | | |
| LIR 403 | | 14.65 | | | | | | | |
| Santolink XI-100 | | 15 | | | | | 15 | | |
| 75% Isopropyl Alcohol | | | | 9.65 | | | | | |
| Amberphos-54 | | | | | | | 6.5 | 6.5 | 6.5 |
| Rxn Time | 37 sec | 32 sec | 55 sec | | | 67 sec | 45 sec | 51 sec | 82 sec |
| Rxn Temp | 292 F. | | 305 F. | | | 282 F. | | 291 F. | |
| % Vertical Expansion | 345% | 188% | 462% | 561% | 638% | 450% | 440% | 340% | 334% |
| Hardness - Shore A | 39 | 45 | 32 | 15 | 3 | 25 | 43 | 35 | 43 |
| Shrinkage | Noticeable | None | Very Slight | None | Very Slight | None | Very Slight | None | Noticeable |

| Components | SAMPLE NO | | | |
|---|---|---|---|---|
| Wt. % | 46 | 47 | 48 | 49 |
| Part A | | | | |
| Uvacure 1500 | 30 | 30 | 30 | 30 |
| Microthene FP800-00 | 10 | 10 | | |
| Airvol 203 S (PVOH) | 10 | 10 | | |
| Erisys GE-60 | | 10 | | |
| SAT 200 (silyl) | | | 20 | |
| Kraton D1107 | | | | 5 |
| Part B | | | | |
| Tone 0301 (Polyol) | 20 | | | |
| Micropearls F30D | 14.85 | 14.85 | 14.85 | 14.85 |
| Amberphos-54 | 6.5 | | | |
| #1 Castor Oil | 9.65 | | | |
| Arcol LG-650 | | 29.65 | | |
| HQ54 (73% $H_3PO_4$) | | 6.5 | 6.5 | |
| Arcol DP-1022 | | | 29.65 | 29.65 |
| $H_3PO_4$ (75% technical grade) | | | | 6.5 |
| Rxn Time | 47 sec | 110 sec | 101 sec | 83 sec |
| Rxn Temp | 287 F. | | 289 F. | |
| % Vertical Expansion | 364% | 350% | 458% | 620% |
| Hardness - Shore A | 32 | 25 | 9 | 7 |
| Shrinkage | Very Slight | Very slight | Noticeable | Significant |

EXAMPLE 19

| Components wt. % | Sample No. 1 | Sample No. 2 | Sample No. 3 | Sample No. 4 |
|---|---|---|---|---|
| Part A | | | | |
| Uvacure 1500 | 30 | 30 | 30 | 30 |
| Microthene FP800-00 | 10 | 10 | 10 | 10 |
| Airvol 203 S (PVOH) | 10 | 10 | 10 | 10 |

-continued

| Components wt. % | Sample No. 1 | Sample No. 2 | Sample No. 3 | Sample No. 4 |
|---|---|---|---|---|
| Part B | | | | |
| Tone 0301 (Polyol) | | | | |
| Micropearls F30D | 14.85 | 14.85 | 14.85 | 14.85 |
| Amberphos-54 (AMMGA) | 6.5 | 6.5 | 6.5 | 6.5 |
| Tone 0201 | 14.65 | 20 | 9.65 | |
| Santolink XI-100 | 15 | 9.65 | 20 | |
| Arcol DP-1022 | | | | 29.65 |
| Initial Rxn Time | 27 sec | 24 sec | — | 63 sec |
| Initial Rxn Temp | 204 F. | — | — | 201 F. |
| Rxn Time | 42 sec | 35 sec | — | 99 sec |
| Rxn Temp | — | — | — | — |
| % Vertical Expansion | 293% | 277% | 249% | 550% |
| Hardness - Shore A | 55 | 59 | 53 | 4 |
| Shrinkage | Significant (>2 mm < 4 mm from edge of tin cup) after cooling to RT | Significant (>2 mm < 4 mm from edge of tin cup) after cooling to RT | Noticeable shrinkage (>1 mm < 2 mm from edge of tin cup) after cooling to RT | Noticeable shrinkage (>1 mm < 2 mm from edge of tin cup) after cooling to RT |

EXAMPLE 20

| Component wt % | Sample No. 1 | Sample No. 2 | Sample No. 3 | Sample No. 4 | Sample No. 5 | Sample No. 6 |
|---|---|---|---|---|---|---|
| Part A | | | | | | |
| Uvacure 1500 | 30 | 30 | 30 | 30 | 40 | 34.46 |
| Nipol 1312 | | | 15 | 15 | | |
| Lucant HC-2000 | 15 | | | | | |
| Carbopol EZ-1 | | 5 | | | | |
| Microthene FP800-00 | | 10 | | | | |
| Microthene FN-514-00 | | | | | 20 | 12.75 |
| Kraton D1107 | | | | | | 3.79 |
| Part B | | | | | | |
| Arcol PPG-425 | 20 | | 15 | 10 | 20 | |
| Micropearls F30D | 14.85 | | 14.85 | 14.85 | 14.85 | 14.85 |
| 75% H$_3$PO$_4$ (tech) | 6.5 | | 6.5 | 6.5 | 6.5 | 6.5 |
| Jeff P. Control Part B | | 50 | | | | |
| Arcol DP-1022 | | | 5 | 10 | | |
| Tone 0301 | | | | | | 14.65 |
| Santolink XI-100 | | | | | | 15 |
| Initial Rxn Time | 40 sec | 34 sec | 51 sec | 50 sec | 51 sec | 29 sec 31 sec |
| Final Rxn Time | 50 sec | 52 sec | 65 sec | 65 sec | 73 sec | 70 sec 65 sec |
| % Ht Expansion | 390% | 423% | 387% | 310% | 292% | 374% |
| Water Absorption | 81% 75% | 31% 33% | 73% 98% | 46% 58% | 19% 28% | 18% (matl chunk) |
| Shore A Hardness | 27 | 28 | 32 | 33 | 62 | 38 |
| Shrinkage | 0 | 0 | ≈5.5 mm | ≈7 mm | 2 mm | 2 mm |

| Component wt % | Sample No. 7 | Sample No. 8 | Sample No. 9 | Sample No. 10 | Sample No. 11 | Sample No. 12 |
|---|---|---|---|---|---|---|
| Part A | | | | | | |
| Uvacure 1500 | 30.4 | 34.46 | 34.46 | 50.7 | 50.7 | 27.9 |
| Kraton D1107 | 3.34 | 3.79 | 3.79 | 5.6 | 5.6 | 3.1 |
| Microthene FN514-00 | 11.26 | 12.75 | 12.75 | 18.8 | 18.8 | 10.3 |
| Part B | | | | | | |
| Tone 0301 | 14.65 | | | | | |
| Santolink XI-100 | 15 | | | | | |
| Micropearls F30D | 14.85 | 14.85 | 11.6 | 14.85 | 14.85 | 14.85 |
| 75% H$_3$PO$_4$ (tech) | 6.5 | 6.5 | 5.1 | 6.5 | 12.5 | 6.5 |
| Arcol PPG-425 | | | | | | 20 |
| Arcol DP-1022 | | 29.65 | 23.3 | 29.65 | 29.65 | |
| Initial Rxn Time | | 83 sec | 96 sec | 101 sec | 28 sec | 41 sec |
| Final Rxn Time | | 107 sec | 132 sec | 136 sec | 42 sec | 58 sec |
| % Ht Expansion | 432% | 398% | 368% | 252% | 313% | 402% |
| Density (g/in$^3$) | | | | | | |
| Water Absorption | | | | | | |
| Shore A Hardness | 36 | 13 | 18 | 28 | 24 | 46 |

-continued

| Shrinkage | 1 mm | 1 mm | 3 mm | 5 mm | 1 mm | 0.5 mm |
|---|---|---|---|---|---|---|
| Component wt % | Sample No. 13 | Sample No. 14 | Sample No. 15 | Sample No. 16 | Sample No. 17 | Sample No. 18 |
| Part A | | | | | | |
| Uvacure 1500 | 40.5 | 40.5 | 40.5 | 46.29 | 46.29 | 40 |
| Microthene FN-514-00 | 4.5 | 4.5 | 4.5 | 8.57 | 8.57 | |
| Kraton D1107 | 15 | 15 | 15 | 5.14 | 5.14 | |
| Nipol 1312 | | | | | | 15 |
| Part B | | | | | | |
| Arcol PPG-425 | 20 | 20 | 20 | 20 | 20 | 20 |
| Micropearls F30D | 14.85 | 24.85 | 24.85 | 24.85 | 24.85 | 24.85 |
| 75% $H_3PO_4$ (tech) | 6.5 | 8.5 | 8.5 | 8.5 | 8.5 | 8.5 |
| Glycolic Acid (70% tech) | | | 6 | | 6 | |
| Initial Rxn Time | 46 sec | 34 sec | 33 sec | 27 sec | 27 sec | 32 sec |
| Final Rxn Time | 58 sec | 48 sec | 49 sec | 40 sec | 39 sec | 46 sec |
| % Ht Expansion | 317% | 377% | 480% | 405% | 395% | 508% |
| Density (g/in$^3$) | | | 1.99 | | | |
| Water Absorption | | 115% 142% | 116% 174% | 59% 131% | 443% 409% | 131% 160% |
| Shore A Hardness | 63 | 42 | 13 | 29 | 13 | 25 |
| Shrinkage | 4 mm | 0.5 mm | 0.5 mm | 1.5 mm | 1 mm | 1 mm |

| Component wt % | Sample No. 19 | Sample No. 20 | Sample No. 21 | Sample No. 22 | Sample No. 23 | Sample No. 24 |
|---|---|---|---|---|---|---|
| Part A | | | | | | |
| Uvacure 1500 | 40 | 40 | 40 | 40 | 40 | 35 |
| Microthene FN-514-00 | | | | | | |
| Kraton D1107 | | | | | | |
| Nipol 1312 | 15 | 15 | 15 | 15 | 15 | 15 |
| Carbopol EZ-1 | | 5 | 5 | | | |
| Epon CMD 50859 | | | | | | 5 |
| Part B | | | | | | |
| Arcol PPG-425 | 20 | 20 | 20 | 20 | 20 | 20 |
| Micropearls F30D | 24.85 | 24.85 | 24.85 | 24.85 | 24.85 | 24.85 |
| 75% $H_3PO_4$ (tech) | 8.5 | 8.5 | 8.5 | 8.5 | 8.5 | 8.5 |
| Glycolic Acid (70% tech) | 6 | | 3 | | | |
| #1 Castor Oil | | | | 8 | | |
| Z6040 | | | | | 1 | |
| Initial Rxn Time | 30 sec | 30 sec | 25 sec | 33 sec | 36 sec | 37 sec |
| Final Rxn Time | 42 sec | 41 sec | 39 sec | 59 sec | 57 sec | 52 sec |
| % Ht Expansion | 382% | 402% | 417% | 421% | 455% | 432% |
| Density (g/in$^3$) | | | | | | |
| Water Absorption | | 144% 133% | 152% 162% | 66% 55% | 105% 108% | 99% 129% (open chunk: 137%) |
| Shore A Hardness | 18 | 24 | 17 | 23 | 29 | 23 |
| Shrinkage | 3 mm | 0 mm | 1.5 mm | 0 mm | 0.5 mm | 0 mm |

| Component wt % | Sample No. 25 | Sample No. 26 | Sample No. 27 | Sample No. 28 | Sample No. 29 | Sample No. 30 |
|---|---|---|---|---|---|---|
| Part A | | | | | | |
| Uvacure 1500 | 40 | 40 | 40 | 40 | 40 | 40 |
| Microthene FN-514-00 | | | | | | |
| Kraton D1107 | | | | | | |
| Nipol 1312 | 15 | | | | | |
| SAT 030 | | 15 | 15 | 15 | 15 | |
| CN 301 | | | | | | 15 |
| Part B | | | | | | |
| Arcol PPG-425 | | 20 | 20 | 20 | 20 | 20 |
| Micropearls F30D | 24.85 | 24.85 | 24.85 | 24.85 | 24.85 | 24.85 |
| 75% $H_3PO_4$ (tech) | 8.5 | 8.5 | 8.5 | 8.5 | 8.5 | 8.5 |
| Arcol Acclaim 6300 | 20 | | | | | |
| #1 Castor Oil | | | 8 | 15 | | 8 |
| Tone EC Monomer | | | | | 10 | |
| Initial Rxn Time | 36 sec | 38 sec | 50 sec | 61 sec | 54 sec | 42 sec |
| Final Rxn Time | — | 56 sec | 74 sec | 95 sec | 73 sec | 60 sec |
| % Ht Expansion | 150% | 555% | 492% | 370% | 467% | 445% |
| Density (g/in$^3$) | | | | 1.939 | | |
| Water Absorption | | 67% 95% (open chunk: 260%) | 48% 45% (open chunk: 49%) | 44% 37% | 50% 95% (open chunk: 75%) | 62% 39% (open chunk: 143%) |

-continued

| | | | | | | |
|---|---|---|---|---|---|---|
| Shore A Hardness | | 18 | 24 | 20 | 25 | 25 |
| Shrinkage | 1.5 mm | 0 mm | 0 mm | 0.5 mm | 3 mm | 0 mm |

| Component wt % | Sample No. 31 | Sample No. 32 | Sample No. 33 | Sample No. 34 | Sample No. 35 | Sample No. 36 |
|---|---|---|---|---|---|---|
| Part A | | | | | | |
| Uvacure 1500 | 40 | 40 | 40 | 40 | 40 | |
| CN 301 | | 15 | | 15 | | |
| Uvacure 1534 | | | | | | 40 |
| Part B | | | | | | |
| Arcol PPG-425 | 20 | | 20 | 20 | 20 | 20 |
| Micropearls F30D | 24.85 | 24.85 | 24.85 | 24.85 | 24.85 | 24.85 |
| 75% H$_3$PO$_4$ (tech) | 8.5 | 8.5 | 8.5 | 8.5 | 8.5 | 8.5 |
| #1 Castor Oil | 8 | 8 | 8 | 8 | 8 | 8 |
| CN 301 | 15 | | 22 | | 15 | 15 |
| Ebecryl 81 | | 20 | | | | |
| Z6040 | | | | 1.5 | | |
| KR TTS | | | | | 1.5 | |
| Initial Rxn Time | 41 sec | 88 sec | 38 sec | 39 sec | 37 sec | 163 sec |
| Final Rxn Time | 59 sec | 120 sec | 55 sec | — | 54 sec | 265+ sec |
| % Ht Expansion | 461% | 153% | 386% | 479% | 433% | |
| Density (g/in$^3$) | | | | | | |
| Water Absorption | 99% 66% (open chunk: 160%) | | 37% 45% (open chunk: 151%) | 45% 34% (open chunk: 158%) | 294% 243% (open chunk: 184%) | |
| Shore A Hardness | 22 | 72 | 22 | 22 | 22 | |
| Shrinkage | 0 mm | 1 mm | 0 mm | 0.5 mm | 0 mm | |

| Component wt % | Sample No. 37 | Sample No. 38 | Sample No. 39 | Sample No. 40 | Sample No. 41 | Sample No. 42 |
|---|---|---|---|---|---|---|
| Part A | | | | | | |
| Uvacure 1500 | 40 | 40 | 40 | 40 | 40 | 50.91 |
| Ricon 100 | 15 | | | | | 19.09 |
| SAT 030 | | 25 | | | | |
| Ricon 184 | | | 15 | 15 | | |
| Expancel 461DU | | | | 10 | | |
| Actipol E-16 | | | | | 15 | |
| Part B | | | | | | |
| Arcol PPG-425 | 20 | 20 | 20 | 20 | 20 | 20 |
| Micropearls F30D | 24.85 | 24.85 | 24.85 | 14.85 | 24.85 | 24.85 |
| 75% H$_3$PO$_4$ (tech) | 8.5 | 8.5 | 8.5 | 8.5 | 8.5 | 8.5 |
| #1 Castor Oil | 8 | 8 | 8 | 8 | 8 | 8 |
| Initial Rxn Time | 39 sec | 66 sec | 39 sec | 31 sec | 39 sec | 43 sec |
| Final Rxn Time | 64 sec | 102 sec | 63 sec | 50 sec | 68 sec | 72 sec |
| % Ht Expansion | 504% | 348% | 470% | 345% | 395% | 432% |
| Density (g/in$^3$) | | | | | | |
| Water Absorption | 77% 79% (open chunk: 119%) | 26% 43% (open chunk: 121%) | 84% 93% (open chunk: 108%) | 60% 63% (open chunk: 166%) | 71% 90% (open chunk: 101%) | 105% 72% (open chunk: 186%) |
| Shore A Hardness | 26 | 22 | 27 | 30 | 32 | 31 |
| Shrinkage | 0 mm | 0 mm | 0 mm | 0 mm | 0 mm | 0.5 mm |

| Component wt % | Sample No. 43 | Sample No. 44 | Sample No. 45 | Sample No. 46 | Sample No. 47 | Sample No. 48 |
|---|---|---|---|---|---|---|
| Part A | | | | | | |
| Uvacure 1500 | 40 | 40 | 40 | 40 | 40 | 40 |
| SAT 030 | 15 | | | 15 | 15 | 15 |
| Kraton L-2203 | | 15 | | | | |
| Erisys GE-35 | | | | | | 10 |
| Part B | | | | | | |
| Arcol PPG-425 | 20 | 20 | 20 | | | 20 |
| Micropearls F30D | 24.85 | 24.85 | 24.85 | 24.85 | 24.85 | 24.85 |
| 75% H$_3$PO$_4$ (tech) | 8.5 | 8.5 | 8.5 | 8.5 | 8.5 | 8.5 |
| #1 Castor Oil | 8 | 8 | 8 | 8 | 8 | 8 |
| CN 301 | 15 | | | | | |
| Santolink XI-100 | | | 10 | | | |
| Tone 0301 | | | | 20 | 29.65 | |
| Initial Rxn Time | 52 sec | 39 sec | 53 sec | 31 sec | 36 sec | 48 sec |
| Final Rxn Time | 84 sec | 65 sec | 83 sec | 49 sec | 53 sec | 77 sec |
| % Ht Expansion | 275% | 431% | 350% | 480% | 502% | 395% |
| Density (g/in$^3$) | | | | | | |
| Water Absorption | 34% 36% (open chunk: | 79% 61% (open chunk: | 26% 40% (open chunk: | 159% 220% (open chunk: | 102% 102% (open chunk: | 96% 75% (open chunk: |

-continued

|  | 119%) | 62%) | 117%) | 212%) | 205%) | 135%) |
|---|---|---|---|---|---|---|
| Shore A Hardness | 30 | 26 | 27 | 17 | 16 | 25 |
| Shrinkage | 0 mm | 0 mm | 0.5 mm | 0 mm | 0 mm | 0 mm |

| Component wt % | Sample No. 49 | Sample No. 50 | Sample No. 51 | Sample No. 52 | Sample No. 53 | Sample No. 54 |
|---|---|---|---|---|---|---|
| Part A | | | | | | |
| Uvacure 1500 | 40 | 40 | 40 | 40 | 40 | 40 |
| SAT 030 | 15 | 15 | 15 | 15 | 15 | 15 |
| Erisys GE-35 | 10 | | | | | |
| Part B | | | | | | |
| Arcol PPG-425 | 20 | 20 | | 20 | 20 | 20 |
| Micropearls F30D | 24.85 | 24.85 | 24.85 | 24.85 | 24.85 | 24.85 |
| 75% $H_3PO_4$ (tech) | 12 | 8.5 | 8.5 | 8.5 | 8.5 | 8.5 |
| #1 Castor Oil | 8 | 8 | 8 | 8 | | 8 |
| Kraton L-2203 | | 15 | | | | |
| Tone 0201 | | | 20 | | | |
| Santicizer 261 | | | | 10 | 15 | |
| Z6124 | | | | | | 2 |
| Z6040 | | | | | | 1 |
| Initial Rxn Time | 29 sec | 59 sec | 27 sec | 51 sec | 53 sec | 45 sec |
| Final Rxn Time | 50 sec | 118 sec | 36 sec | 67 sec | 63 sec | 78 sec |
| % Ht Expansion | 410% | 317% | 422% | 263% | 225% | 458% |
| Density (g/in³) | 1.826 | | | | | |
| Water Absorption | 74% (open chunk: 53% & 64%) | 29% 44% (open chunk: 86%) | 104% 138% (open chunk: 133%) | 19% 22% (open chunk: 75%) | 41% 54% (open chunk: 137%) | 22% 24% (open chunk: 180%) |
| Shore A Hardness | 12 | 34 | 30 | 44 | 50 | 23 |
| Shrinkage | 0 mm | 0.5 mm | 2 mm | 0 mm | 0 mm | 0.5 mm |

| Component wt % | Sample No. 55 | Sample No. 56 | Sample No. 57 | Sample No. 58 | Sample No. 59 | Sample No. 60 |
|---|---|---|---|---|---|---|
| Part A | | | | | | |
| Uvacure 1500 | 40 | 40 | 40 | 40 | 40 | 40 |
| SAT 030 | | | | 15 | | |
| SAT 010 | 15 | | | | | |
| SAT 200 | | 15 | | | | |
| PBD 605 | | | 15 | | 15 | 15 |
| Part B | | | | | | |
| Arcol PPG-425 | 20 | 20 | 20 | 20 | 20 | 15 |
| Micropearls F30D | 24.85 | 24.85 | 24.85 | 24.85 | 24.85 | 24.85 |
| 75% $H_3PO_4$ (tech) | 8.5 | 8.5 | 8.5 | 8.5 | 8.5 | 8.5 |
| #1 Castor Oil | 8 | 8 | 8 | 8 | 8 | 8 |
| Santicizer 261 | | | | 5 | 5 | 10 |
| Z6124 | | | | 2 | 2 | 2 |
| Z6040 | | | | 1 | 1 | 1 |
| Initial Rxn Time | 58 sec | 50 sec | 40 sec | 51 sec | 40 sec | 29 sec |
| Final Rxn Time | 83 sec | 76 sec | 80 sec | 85 sec | 69 sec | 39 sec |
| % Ht Expansion | 444% | 435% | 536% | 388% | 433% | 320% |
| Density (g/in³) | | | | | | |
| Water Absorption | 44% 60% (open chunk: 191%) | 96% 105% (open chunk: 131%) | 25% 27% (open chunk: 34%) | 65% 53% (open chunk: 85%) | 32% 33% (open chunk: 54%) | 115% 105% (open chunk: 197%) |
| Shore A Hardness | 25 | 20 | 24 | 22 | 23 | 19 |
| Shrinkage | 0 mm | 0 mm | 0 mm | 0 mm | 0.5 mm | 0.5 mm |

| Component wt % | Sample No. 60 | Sample No. 61 | Sample No. 62 | Sample No. 63 | Sample No. 64 | Sample No. 65 |
|---|---|---|---|---|---|---|
| Part A | | | | | | |
| Uvacure 1500 | 40 | 40 | 40 | 40 | 40 | 40 |
| PBD 605 | 15 | 20 | 25 | 15 | 15 | 15 |
| Part B | | | | | | |
| Arcol PPG-425 | 20 | 20 | 20 | 20 | 25 | 20 |
| Micropearls F30D | 24.85 | 24.85 | 24.85 | 24.85 | 24.85 | 14.85 |
| 75% $H_3PO_4$ (tech) | 8.5 | 8.5 | 8.5 | 8.5 | 8.5 | 6.5 |
| #1 Castor Oil | 6 | 6 | 6 | 3 | 8 | |
| Santicizer 261 | 7 | 7 | 7 | 5 | | |
| Z6124 | 2 | 2 | 2 | | | |
| Z6040 | 1 | 1 | 1 | | | |
| Initial Rxn Time | 37 sec | 43 sec | 43 sec | 42 sec | 46 sec | 48 sec 42 sec |
| Final Rxn Time | 62 sec | 74 sec | 72 sec | 71 sec | 86 sec | 77 sec 60 sec |
| % Ht Expansion | 411% | 357% | 337% | 493% | 423% | 475% 486% |
| Density (g/in³) | | | | | | 2.17 |

| | | | | | | |
|---|---|---|---|---|---|---|
| | | | | -continued | | |
| Water Absorption | 28% 26% (open chunk: 119%) | 17% 25% (open chunk: 126%) | 56% 34% (open chunk: 121%) | 43% 49% (open chunk: 134%) | 29% 26% (open chunk: 71%) | 17% 15% (open chunk: 14%) |
| Shore A Hardness | 23 | 22 | 18 | 20 | 20 | 29 30 |
| Shrinkage | 0.5 mm | 0.5 mm | 0.5 mm | 0.5 mm | 0.5 mm | 0.8 mm |

| Component wt % | Sample No. 66 | Sample No. 67 | Sample No. 68 |
|---|---|---|---|
| Part A | | | |
| Uvacure 1500 | 40 | 40 | 40 |
| PBD 605 | 15 | 15 | 15 |
| Z6040 | | | 1 |
| Part B | | | |
| Arcol PPG-425 | 20 | 20 | 20 |
| Micropearls F30D | 24.85 | 24.85 | 24.85 |
| 75% $H_3PO_4$ (tech) | 8.5 | 8.5 | 8.5 |
| #1 Castor Oil | 3 | 3 | 3 |
| Santicizer 261 | 7 | 7 | 7 |
| Z6124 | | 2 | 2 |
| Initial Rxn Time | 39 sec | 38 sec | 41 sec |
| Final Rxn Time | 65 sec | 55 sec | 56 sec |
| % Ht Expansion | 455% | 403% | 439% |
| Density (g/in$^3$) | | | |
| Water Absorption | 57% 72% (open chunk = 153%) | 131% 130% (open chunk = 160%) | 107% 88% (open chunk = 156%) |
| Shore A Hardness | 28 | 25 | 28 |
| Shrinkage | 0.5 mm | 0.5 mm | 1 mm |

EXAMPLE 21

| Component wt % | Sample No. 1 | Sample No. 2 | Sample No. 3 | Sample No. 4 | Sample No. 5 | Sample No. 6 |
|---|---|---|---|---|---|---|
| Part A | | | | | | |
| Uvacure 1500 | 32.7 | 36.4 | 43.6 | 40 | 40 | 40 |
| PBD 605 | 12.3 | 13.6 | 16.4 | 20 | 25 | 15 |
| Part B | | | | | | |
| Arcol PPG-425 | 20 | 20 | 20 | 20 | 20 | 20 |
| Micropearls F30D | 14.85 | 14.85 | 14.85 | 14.85 | 14.85 | 14.85 |
| 75% $H_3PO_4$ (tech) | 6.5 | 6.5 | 6.5 | 6.5 | 6.5 | 6.5 |
| Santicizer 160 | | | | | | 4 |
| Initial Rxn Time | 47 sec | 47 sec | 50 sec | 51 sec | 54 sec | 49 sec |
| Final Rxn Time | 75 sec | 70 sec | 78 sec | — | 104 | 67 sec |
| % Ht Expansion | 564% | 454% | 430% | 427% | 387% | 426% |
| Density (g/in$^3$) | | | | | | |
| $H_2O$ Absorption 1 | | | | | | |
| $H_2O$ Absorption 2 | | | | | | |
| $H_2O$ Absorption 3 | 37% | 31% | 14% | 28% 30% | 42% 31% | 74% |
| Shore A Hardness | 28 | 31 | 32 | 33 | 33 | 38 |
| Shrinkage | 0 mm | 0.3 mm | 1.5 mm | 0.8 mm | 0.5 mm | 3 mm |

| Component wt % | Sample No. 7 | Sample No. 8 | Sample No. 9 | Sample No. 10 | Sample No. 11 | Sample No. 12 |
|---|---|---|---|---|---|---|
| Part A | | | | | | |
| Uvacure 1500 | 40 | 40 | 40 | 40 | 40 | 40 |
| PBD 605 | 15 | 15 | 15 | 10 | 15 | 15 |
| Part B | | | | | | |
| Arcol PPG-425 | 20 | 20 | 20 | 20 | 20 | 20 |
| Micropearls F30D | 14.85 | 14.85 | 14.85 | 14.85 | 14.85 | 14.85 |
| 75% $H_3PO_4$ (tech) | 6.5 | 6.5 | 6.5 | 6.5 | 8 | 9.5 |
| Santicizer 160 | 8 | | | | | |
| Santicizer 278 | | 4 | 8 | | | |
| Initial Rxn Time | 51 sec | 54 sec | 55 sec | 42 sec | 32 sec | 27 sec |
| Final Rxn Time | 71 sec | 80 sec | 83 sec | 57 sec | — | 38 sec |
| % Ht Expansion | 332% | 395% | 338% | 529% | 567% | 500% |
| Density (g/in$^3$) | | | | | | |
| $H_2O$ Absorption 1 | | 44% 23% | 26% 26% | 61% 90% | 25% 33% | 56% 65% |

-continued

| | | | | | | |
|---|---|---|---|---|---|---|
| H₂O Absorption 2 | | | | | | |
| H₂O Absorption 3 | 106% | 63% | 87% | 126% | 34% | 92% 83% |
| Shore A Hardness | 43 | 24 | 32 | 30 | 29 | 28 |
| Shrinkage | 4 mm | 2 mm | 2 mm | 0 mm (had radial shrinkage) | 0.5 mm (had radial shrinkage) | 0.75 mm (had radial shrinkage) |

| Component wt % | Sample No. 13 | Sample No. 14 | Sample No. 15 | Sample No. 16 | Sample No. 17 | Sample No. 18 |
|---|---|---|---|---|---|---|
| Part A | | | | | | |
| Uvacure 1500 | 40 | 40 | 40 | 40 | 40 | 40 |
| PBD 605 | 15 | 15 | 15 | 15 | 15 | 15 |
| Epon SU2.5 | 10 | | | | | |
| Epon 828 | | | | 5 | | |
| Part B | | | | | | |
| Arcol PPG-425 | 20 | | 29.98 | | 20 | 20 |
| Micropearls F30D | 14.85 | 14.85 | 22.27 | 14.85 | 14.85 | 14.85 |
| 75% H₃PO₄ (tech) | 6.5 | 6.5 | 9.75 | 6.5 | 6.5 | |
| CAPA 316 | | 20 | | | | |
| Tone 0301 | | | | 20 | | |
| Dicy 1400 | | | | 2 | 0.26 | |
| 85% H₃PO₄ (tech) | | | | | | 6.5 |
| Initial Rxn Time | — | 20 sec | 50 sec | 74 sec | 49 sec | 36 sec |
| Final Rxn Time | — | — | — | 99 sec | 70 sec | 76 sec |
| % Ht Expansion | 414% | 430% | 445% | | 451% | 433% |
| Density (g/in³) | | | | | | |
| H₂O Absorption 1 | | | 97% 106% | | | 19% 14% |
| H₂O Absorption 2 | | | | | | |
| H₂O Absorption 3 | 40% 56% | 69% 65% 57% | 128% | | | 22% 13% 17% |
| Shore A Hardness | 53 | 43 | 26 | | 30 | 32 |
| Shrinkage | 3 mm | 0 mm (had radial shrinkage) | 2.8 mm | very significant | 2.6 mm | 0 mm |

| Component wt % | Sample No. 19 | Sample No. 20 | Sample No. 21 | Sample No. 22 | Sample No. 23 | Sample No. 24 |
|---|---|---|---|---|---|---|
| Part A | | | | | | |
| Uvacure 1500 | 40 | 40 | 35 | 35 | 35 | 40 |
| PBD 605 | 15 | 15 | 15 | 15 | 15 | 15 |
| Epon 828 | | | | | | 10 |
| Part B | | | | | | |
| Arcol PPG-425 | 20 | | | | | 20 |
| Micropearls F30D | 14.85 | 14.85 | 14.85 | 14.85 | 14.85 | 14.85 |
| 75% H₃PO₄ (tech) | 6.5 | 6.5 | 6.5 | 5 | 8 | 6.5 |
| Ebecryl 170 | 5 | | | | | 15 |
| Desmophen L-951 | | 20 | 20 | 20 | 20 | |
| Initial Rxn Time | 25 sec | 44 sec 50 sec | 48 sec 48 sec | 72 sec | 37 sec 34 sec | 18 sec |
| Final Rxn Time | 43 sec | 64 sec 67 sec | 79 sec 70 sec | 100 sec | 57 sec 51 sec | 35 sec |
| % Ht Expansion | 415% | 467% 510% | 505% 442% | 420% | 530% 535% | 289% |
| Density (g/in³) | 1.93 | 2.02 | | | | |
| H₂O Absorption 1 | 9% 15% | 15% 18% | 20% 22% | | 39% 19% | |
| H₂O Absorption 2 | | | | | 36% | |
| H₂O Absorption 3 | 39% 22% | 32% 22% 37% | 60% 49% 73% | | 66% 55% 61% | 81% 48% |
| Shore A Hardness | 35 | 38 31 | 29 32 | 31 | 30 27 | 52 |
| Shrinkage | 0.3 mm | 1.5 mm 0.8 mm | 0.5 mm 0.75 mm | 3.3 mm | 0.5 mm 0.75 mm | 2 mm |

| Component wt % | Sample No. 25 | Sample No. 26 | Sample No. 27 | Sample No. 28 | Sample No. 29 | Sample No. 30 |
|---|---|---|---|---|---|---|
| Part A | | | | | | |
| Uvacure 1500 | 40 | 30 | 40 | 30 | 40 | 40 |
| PBD 605 | 15 | | 15 | 15 | 15 | 7.5 |
| Epon 828 | | | | 10 | | |
| SAT 030 | | | | | | 7.5 |
| Part B | | | | | | |
| Arcol PPG-425 | | | | | | 20 |
| Micropearls F30D | 14.85 | 14.85 | 14.85 | 14.85 | 14.85 | 14.85 |
| 75% H₃PO₄ (tech) | | | 6.5 | 6.5 | 6.5 | 6.5 |
| Desmophen L-951 | 20 | | 10 | 20 | | |
| Ebecryl 170 | 20 | 30 | 5 | 5 | | |
| Santicizer 261 | | | 10 | | | |
| K-Flex 188 | | | | | 20 | |
| Initial Rxn Time | | <10 sec | 21 sec | 25 sec | 27 sec | 48 sec |
| Final Rxn Time | | | 36 sec | 41 sec | — | 61 sec |
| % Ht Expansion | | 350% | 358% | 333% | 456% | |
| Density (g/in³) | | | | 3.45 | | |

-continued

|  |  |  |  |  |  |  |
|---|---|---|---|---|---|---|
| H$_2$O Absorption 1 |  |  |  | 28% 38% |  |  |
| H$_2$O Absorption 2 |  |  |  | 89% |  |  |
| H$_2$O Absorption 3 |  |  | 94% 95% | 84% 83% 85% | 32% 28% 30% | 19% 22% |
| Shore A Hardness |  |  | 39 | 37 | 47 |  |
| Shrinkage |  | 0.5 mm | 2.5 mm | 2.5 mm | 0.9 mm |  |

| Component wt % | Sample No. 31 | Sample No. 32 | Sample No. 33 | Sample No. 34 | Sample No. 35 | Sample No. 36 |
|---|---|---|---|---|---|---|
| Part A |  |  |  |  |  |  |
| Uvacure 1500 | 40 | 40 | 40 | 40 | 40 | 20 |
| PBD 605 | 7.5 |  | 15 | 15 |  | 15 |
| Epon 828 |  |  |  |  |  |  |
| SAT 030 | 7.5 |  |  |  |  |  |
| Trilene M-101 |  | 15 |  |  |  |  |
| Hycar 1300x40 |  |  |  |  | 15 |  |
| Uvacure 1533 |  |  |  |  |  | 20 |
| Part B |  |  |  |  |  |  |
| Arcol PPG-425 | 20 | 20 | 20 | 20 | 20 | 20 |
| Micropearls F30D | 14.85 | 14.85 | 14.85 | 14.85 | 14.85 | 14.85 |
| 75% H$_3$PO$_4$ (tech) | 6.5 | 6.5 | 6.5 | 6.5 | 6.5 | 6.5 |
| Ebecryl 170 | 2 |  |  |  |  |  |
| #1 Castor Oil |  |  | 6 |  |  |  |
| Santicizer 141 |  |  |  | 10 |  |  |
| Initial Rxn Time | 31 sec | 46 sec | 49 sec | 56 sec | 45 sec | 47 sec |
| Final Rxn Time | 49 sec | 60 sec | 68 sec | 71 sec | 55 sec | 78 sec |
| % Ht Expansion |  | 394% |  |  |  |  |
| Density (g/in$^3$) |  |  |  |  |  |  |
| H$_2$O Absorption 1 |  |  |  |  |  |  |
| H$_2$O Absorption 2 |  |  |  |  |  |  |
| H$_2$O Absorption 3 | 22% 23% | 114% 81% 107% | 17% 15% | 51% 70% |  | 30% 34% |
| Shore A Hardness |  | 40 |  |  |  |  |
| Shrinkage |  | 2.75 mm |  |  |  |  |

| Component wt % | Sample No. 37 | Sample No. 38 | Sample No. 39 | Sample No. 40 | Sample No. 41 | Sample No. 42 |
|---|---|---|---|---|---|---|
| Part A |  |  |  |  |  |  |
| Uvacure 1500 | 25 | 40 | 40 | 40 |  |  |
| PBD 605 | 15 | 15 | 15 | 15 |  |  |
| Epon 828 |  |  |  |  | 45 | 45 |
| Uvacure 1534 | 15 |  |  |  |  |  |
| Part B |  |  |  |  |  |  |
| Arcol PPG-425 | 20 | 20 | 20 | 20 |  |  |
| Micropearls F30D | 14.85 | 14.85 | 14.85 | 14.85 | 15 | 15 |
| 75% H$_3$PO$_4$ (tech) | 6.5 |  |  |  |  |  |
| H$_3$PO$_4$ (conc: >95%) |  | 6.5 | 4.9 | 4 | 10 | 10 |
| Tone EC Monomer |  |  |  |  | 20 |  |
| #1 Castor Oil |  |  |  |  |  | 20 |
| Initial Rxn Time | 58 sec | 28 sec | 33 sec | 37 sec | 58 sec | 33 sec |
| Final Rxn Time | 73 sec | 37 sec | 52 sec | 50 sec | 93 sec | — |
| % Ht Expansion |  | 274% | 261% | 181% | 510% | 300% |
| Density (g/in$^3$) |  |  |  |  | 1.8 |  |
| H$_2$O Absorption 1 |  |  |  |  |  |  |
| H$_2$O Absorption 2 |  |  |  |  |  |  |
| H$_2$O Absorption 3 | 27% 33% |  | 15% 20% (72 hrs) |  | 37% 38% (72 hrs) |  |
| Shore A Hardness |  | 62 | 60 | 62 | 48 | 68 |
| Shrinkage |  |  |  |  | 0 mm | 0 mm |

| Component wt % | Sample No. 43 | Sample No. 44 | Sample No. 45 | Sample No. 46 |
|---|---|---|---|---|
| Part A |  |  |  |  |
| Epon 828 | 45 | 45 | 50 | 50 |
| Vertrel XF |  |  |  | 5 |
| Part B |  |  |  |  |
| Micropearls F30D | 15 | 15 | 15 | 10 |
| H$_3$PO$_4$ (conc: >95%) | 10 | 20 | 10 | 10 |
| Santicizer 261 | 20 |  |  |  |
| Pure Grain Alcohol (EtOH) |  | 20 |  |  |
| Santicizer 97 |  |  | 20 | 20 |
| Initial Rxn Time | 24 sec | 108 sec | 27 sec | 26 sec |
| Final Rxn Time | 72 sec | 130 sec | — | — |
| % Ht Expansion | 182% | 575% | 376% | 297% |

|  |  |  |
|---|---|---|
| Density (g/in³) |  | 1.37 |
| H₂O Absorption 1 |  |  |
| H₂O Absorption 2 |  |  |
| H₂O Absorption 3 |  | 843% |
|  |  | (after 15 mins) |
| Shore A Hardness | 78 | 4 | 62 |
| Shrinkage | 0.5 mm | 0.5 mm | 0 mm |

EXAMPLE 22

| Component wt % | Sample No. 1 | Sample No. 2 | Sample No. 3 | Sample No. 4 | Sample No. 5 | Sample No. 6 |
|---|---|---|---|---|---|---|
| Part A |  |  |  |  |  |  |
| Uvacure 1500 | 40 |  |  |  |  |  |
| PBD 605 | 15 |  |  |  |  |  |
| Epon 828 |  | 40 | 40 | 35 | 35 | 50 |
| Santicizer 97 |  |  |  | 5 | 5 |  |
| Part B |  |  |  |  |  |  |
| Desmophen L-951 | 20 |  |  |  |  |  |
| H₃PO₄ (75% tech) | 6.5 |  |  |  |  |  |
| Micropearls F30D | 2 | 10 | 10 | 10 | 10 | 10 |
| H₃PO₄ (>95% conc) |  | 10 | 10 | 10 | 10 | 10 |
| Arcol PPG-425 |  | 20 |  |  |  |  |
| Santicizer 97 |  |  | 20 | 20 | 15 | 20 |
| #1 Castor Oil |  |  |  |  | 5 |  |
| Initial Rxn Time | 43 sec | 263 sec | 20 sec | 19 sec | 24 sec | 25 sec |
| Final Rxn Time | 54 sec | 299 sec | — | — | — | — |
| % Ht Expansion | 86% | 308% | 189% | 118% | 122% | 184% |
| Density (g/in³) |  | 2.50 | 6.20 |  | 6.93 | 6.13 |
| H₂O Absorption 1 | 3% |  |  |  |  |  |
| H₂O Absorption 2 |  |  |  |  |  |  |
| H₂O Absorption 3 | 3% | 27% 23% | 8% 10% | 18% 22% 18% | 11% 12% | 5% 6% |
| Shore A Hardness |  |  | 88 | 90 | 88 | 88 |
| Shore D Hardness | (32) |  | 27 (30) | 30 (32) | 27 (30) | 28 (30) |
| (##) = calculated |  |  |  |  |  |  |
| Shrinkage | 2.2 mm | 0 mm | 0 mm | 0 mm | 0 mm | 0 mm |

| Component wt % | Sample No. 7 | Sample No. 8 | Sample No. 9 | Sample No. 10 | Sample No. 11 | Sample No. 12 |
|---|---|---|---|---|---|---|
| Part A |  |  |  |  |  |  |
| Epon 828 | 40 | 20 | 40 | 40 | 40 | 60 |
| CMD 50859 |  | 20 |  |  |  |  |
| Tone EC |  |  |  |  | 2 | 3 |
| Part B |  |  |  |  |  |  |
| Santicizer 97 |  | 20 | 20 | 15 | 15 | 15 |
| H₃PO₄ (>95% conc) | 10 | 10 | 10 | 10 | 10 | 10 |
| Micropearls F30D | 10 | 10 | 6 | 6 | 4 | 4 |
| Santicizer 160 | 20 |  |  |  |  |  |
| #1 Castor Oil |  |  |  | 5 | 5 | 5 |
| Initial Rxn Time | 17 sec | 22 sec | 18 sec | 22 sec | 22 sec | 30 sec |
| Final Rxn Time | — | — | — | — | — | — |
| % Ht Expansion | 260% | 152% | 120% | 145% | 99% | 92% |
| Density (g/in³) |  | 4.20 | 7.03 | 6.40 | 6.94 | 8.19 |
| H₂O Absorption 1 |  |  |  |  |  |  |
| H₂O Absorption 2 |  |  |  |  |  |  |
| H₂O Absorption 3 | 40% 32% 39% | 50% 34% | 13% 12% | 13% 11% | 15% 10% | 3% 2% |
| Shore A Hardness |  | 80 | 91 | 86 | 93 | 98 |
| Shore D Hardness |  | 23 (22) | 32 (33) | 26 (28) | 34 (36) | 46 (42) |
| (##) = calculated |  |  |  |  |  |  |
| Shrinkage | 0 mm | 0 mm | 0 mm | 0 mm | 0 mm | 0 mm |

| Component wt % | Sample No. 13 | Sample No. 14 | Sample No. 15 | Sample No. 16 | Sample No. 17 | Sample No. 18 |
|---|---|---|---|---|---|---|
| Part A |  |  |  |  |  |  |
| Epon 828 | 40 | 60 | 80 | 80 | 50 | 50 |
| Santicizer 97 | 5 | 7.5 | 10 | 10 |  |  |
| Vertrel XF |  |  |  | 5 |  | 10 |

| Part B | | | | | | |
|---|---|---|---|---|---|---|
| Santicizer 97 | 15 | 15 | 15 | 15 | 20 | 20 |
| $H_3PO_4$ (>95% conc) | 10 | 10 | 10 | 10 | 10 | 10 |
| Micropearls F30D | 6 | 6 | 6 | 6 | 5 | 10 |
| #1 Castor Oil | 10 | 10 | 10 | 10 | — | 10 |
| Initial Rxn Time | — | — | 69 sec | 66 sec | 24 sec | 41 sec |
| Final Rxn Time | — | — | — | — | — | — |
| % Ht Expansion | — | — | 60% | 61% | 238% | 123% |
| Density (g/in$^3$) | — | — | — | — | — | 4.64–8.38 |
| $H_2O$ Absorption 1 | — | — | — | — | — | — |
| $H_2O$ Absorption 2 | — | — | — | — | — | — |
| $H_2O$ Absorption 3 | 14% | 8% 8% | 1% 1% | — | — | 32% 35% |
| Shore A Hardness | — | — | — | 90 | — | 90 |
| Shore D Hardness (##) = calculated | — | — | — | (32) | — | 29 (32) |
| Shrinkage | — | — | 0 mm | 0 mm | 0 mm | 0 mm |

| Component wt % | Sample No. 19 |
|---|---|
| Part A | |
| Epon 828 | 65 |
| Santicizer 97 | 5 |
| Part B | |
| Santicizer 97 | 15 |
| $H_3PO_4$ (>95% conc) | 10 |
| Micropearls F30D | 10 |
| Initial Rxn Time | 25 sec |
| Final Rxn Time | — |
| % Ht Expansion | 176% |
| Density (g/in$^3$) | 6.55 |
| $H_2O$ Absorption 1 | |
| $H_2O$ Absorption 2 | |
| $H_2O$ Absorption 3 | 4% 4% (after 48 hrs) |
| Shore A Hardness | 93 |
| Shore D Hardness (## = calculated) | (36) |
| Shrinkage | 0 mm |

EXAMPLE 23

This Example illustrates the ability to tailor the inventive foam compositions and obtain foams having a wide range of characteristics. A foam of relatively low density was produced by in accordance with Example 18. The foam was obtained by combining the following foam precursors:

| AMOUNT | COMPONENT | TRADE NAME | SUPPLIER |
|---|---|---|---|
| | | Part A: | |
| 18.2 g | cylcoaliphatic epoxy | Uvacure 1500 | Radcure |
| 1.8 g | phenoxy resin | Phenoxy PKHP-200 | Paphen |
| 30 g | bis-A epoxy | D.E.R. 736 | Dow Chemical |
| | | Part B: | |
| 29.65 g. | caprolactone polyol | Tone 0301 | Union Carbide |
| 14.85 g. | vinylidene chloride encapsulated iso-butane | Micropearls F30D | Pierce & Stevens |
| 5.5 g. | phosphoric Acid (85%) | | ACROS |

Each component (Part A & B) was individually mixed by hand using a hand driven paddle in a cup or ointment can. The two were brought together in a single vessel, again mixed by hand, and allowed to react. The foam produced was similar in appearance to other types listed above, but had a final specific gravity 0.16 g/ml.

EXAMPLE 24

The following Example demonstrates employing the inventive foam as a structural material between two laminates to fabricate furniture. The components listed in the following Table were combined in accordance with Examples 18–22.

| Components wt. % | Sample No. 1 | Sample No. 2 | Sample No. 3 | Sample No. 4 |
|---|---|---|---|---|
| Part A | | | | |
| Epon 828 | 75 | — | — | 50 |
| Santicizer 97 | 5 | — | — | — |
| Epon 813 | — | 50 | — | — |
| Epon 825 | — | — | 50 | — |
| Part B | | | | |
| Santicizer 97 | 20 | 20 | 20 | 23 |
| H$_3$PO$_4$ (>95% conc) | 10 | 10 | 10 | 10 |
| Micropearls F30D | 10 | 10 | 10 | 10 |
| Initial Rxn Time | 40 sec | 33 sec | 28 sec | 28 sec |
| Final Rxn Time | — | — | — | — |
| % Ht Expansion | 136% | 262% | 225% | 170% |
| Density 1 (g/in$^3$) | — | — | — | — |
| Density 2 (g/in$^3$) | 8.77 | — | 5.70 | 5.52 |
| H$_2$O Absorption 1 | 1% 1% 2% | — | — | — |
| H$_2$O Absorption 2 | — | — | — | — |
| Shore A Hardness | 95 | — | — | 81 |
| Shore D Hardness | 40 | — | — | — |
| (##) = calculated | (38) | | | (23) |
| Shrinkage | 0 mm | 0 mm Had significant radial shrinkage | 0 mm | 0 mm |

The following Table lists components employed in the above Table for making foam.

| Trade Name | Component | Supplier |
|---|---|---|
| #1 Castor Oil | #1 Castor Oil | Commercial |
| Epon 825 | Bis A Epoxy | Shell Chemical Co. |
| Epon 828 | Bis A Epoxy | Shell Chemical Co. |
| Epon 813 | Bis A Epoxy Modified: (74% Bisphenol A epichlorohydrin resin & 26% Cresyl glycidyl ether) | Shell Chemical Co. |
| Santicizer 97 | Dialkyl Adipate | Solutia |
| H$_3$PO$_4$ (>95% conc) | Phosphoric acid: Took Harcros 75% Technical Grade & distilled to > 90% acid concentration | DeNOVUS |
| Micropearls F30D | Therma Blowing Agent: isobutane encapsulated in polymer vinylidene chloride | HM Royal (Pierce & Stevens) |

Sample No. 1 above was combined and introduced into a mold comprising standard 1"×4"×12" boards and laminating materials comprising wood-grain Formica® and fiber-reinforced paper board that were maintained a defined distance about by wood spacers, i.e., a distance of about ½ inch. The boards and laminating materials were placed into "C" clamps and a vise. The foam composition was prepared and poured between the laminating materials. Once the foam reaction was completed and the foam had cooled to room temperature, the assembly was visually inspected. The foam had adhered to the laminating materials and provided structural support.

EXAMPLE 25

| Component Wt. % | Sample No. 1 | Sample No. 2 | Sample No. 3 | Sample No. 4 | Sample No. 5 | Sample No. 6 |
|---|---|---|---|---|---|---|
| Part A | | | | | | |
| Epon 828 | 48 | 23 | 50 | 34.5 | 50 | 50 |
| Santicizer 97 | 2 | | | | | |
| Epon 825 | | 23 | | 9.5 | | |
| Part B | | | | | | |
| Santicizer 97 | 19.8 | 20 | 20 | 18 | | |
| H$_3$PO$_4$ (>95% conc) | 11 | 10 | 10 | 10 | 10 | 10 |
| Micropearls F30D | 13.7 | 12.5 | 2 | 12.5 | 12.5 | 12.5 |
| Expancel 642DU | | | 2 | | | |
| Expancel 820DU | | | 2 | | | |
| Expancel 551DU | | | 2 | | | |
| Expancel 461DU | | | 2 | | | |
| SR 239 | | | | | 20 | |
| SR 495 | | | | | | 20 |

-continued

| Component Wt. % | Sample No. 1 | Sample No. 2 | Sample No. 3 | Sample No. 4 | Sample No. 5 | Sample No. 6 |
|---|---|---|---|---|---|---|
| Initial Rxn Time | 28 sec 26 sec | 38 sec | 38 sec | 28 sec 34 sec | 41 sec | 79 sec |
| % Ht Expansion | 289% | 320% | 240% | 306% 275% | 269% | 399% |
| Density 1 (g/in$^3$) | | 2.41–2.75 | | | | |
| Density 2 (g/in$^3$) | 3.35 | | | | | |
| H$_2$O Absorption 1 | 16% 20% | 13% 13% | | | | |
| Shore A Hardness | 50 | 63 | | | | |
| Shrinkage | 0 mm | 0 mm | 0 mm | 0 mm | 0.5 mm (had radial shrinkage) | 1 mm (had radial shrinkage) |

EXAMPLE 26

The following Example demonstrates a composition of the instant invention that can be dispensed via a commercially available dual tube caulk gun.

| Product Name | Chemical Name | Supplier | % range |
|---|---|---|---|
| Part A | | | |
| Epon 862 | Bis F epoxy resin | Shell | 5–75 |
| Cardura E-10 | glycidyl ester | Walsh & Assoc | 1–30 |
| Polybd ® 605 E | polybutadiene | Elf Atochem | 1–60 |
| Micropearls F30 D | Isobutane encapsulated in Polymer vinylidene chloride | HM Royal | 10–75 |
| Part B | | | |
| Phosphoric acid | phosphoric acid | Harcross | 3–25 |
| CD513 | methacrylate | Sartomer | 1–10 |
| SR495 | caprolactone acrylate | Sartomer | 1–10 |

Parts A and B were prepared separately by being mixed in lab scale beakers. Parts A and B were mixed and dispensed by using a 4:1 TAH Industries motionless mixer tube.

EXAMPLE 27

The following Table lists the Raw Materials that were employed in Example 27. The foam in Example 27 was prepared and tested in accordance with Examples 18–22 and 25. This Example illustrates foam having desirable flame resistant characteristics. Such foam can be employed in a wide range of applications including aerospace (e.g., aircraft insulation), automotive (e.g., sound abatement and structural support), among other end uses.

| Raw Material | Description | Supplier |
|---|---|---|
| Intelimer 7004 | Polymer Bound Imidazole Catalyst: MP = 149F | Landec |
| Intelimer 7024 | Encapsulated 2-Ethyl-4-Methyl Imidazole: MP = 149F | Landec |
| Intelimer 7124 | Polymer Bound Imidazole Catalyst | Landec |
| PEP 6137 | Acrylic Monomer Modifier Epoxy: EEW = 150: Visc = 950 cP | Pacific Epoxy |
| PEP 6138 | Acrylic Monomer Modified Epoxy: EEW = 150: Visc = 100 cP | Pacific Epoxy |
| PEP 6139 | Acrylic Monomer Modified Epoxy: EEW = 130: Visc = 3000 cP | Pacific Epoxy |
| PEP 6264 | Urethane Modified Epoxy: EEW = 210: Visc = 2000 cP | Pacific Epoxy |
| PEP 6431 | Novolac: EEW = 170: visc = 25,000: fnc = 2.2 | Pacific Epoxy |
| PEP 6433 | Novolac: EEW = 170: visc = 8000: fnc = 2.2 | Pacific Epoxy |
| NPEK-119 | Bis A Epoxy: EEW = 180–195: Visc = 500–1200 | Peninsula Polymers/Nan Ya Corporation |
| Epon 824 | Bis A/Epichlorohydrin Based Epoxy Resin (85–90%) & Modified Base Epoxy Resin (10–15%) | Walsh & Assoc/Shell Chemical |
| Epon 826 | Bis A/Epichlorohydrin Based Epoxy Resin: EEW = 182: Visc = 8000 cP | Walsh & Assoc/Shell Chemical |
| SR 239 | DiFunctional: 1,6 Hexanediol Dimethacrylate: visc = 8: hydrophobic backbone | Sartomer |
| SR 9009 | TriFunctional: Trifunctional Methacrylate: visc = 35 | Sartomer |
| CD 9050 | Monofunctional Acid Ester: Adhesion Promoting Monomer: visc = 20 | Walsh & Assoc/Sartomer |
| CD 9051 | Trifunctional Acid Ester: Adhesion Promoting Monomer: visc = 250 | Walsh & Assoc/Sartomer |

-continued

| | | |
|---|---|---|
| SR 444 | Trifunctional Monomer: Pentaerythritol Triacrylate: Hydroxy Pendant Group: visc = 520 cP | Walsh & Assoc/Sartomer |
| CD 513 | Methacrylate Ester (Propoxylated$_2$ Allyl Methacrylate): Commercially available under 5E consent | Sartomer |
| Ebecryl 2047 | Trifunctional Acrylated Diluting Oligomer: visc = 400 cP: tensile = 1000 psi: elong = 8%: Tg = 3F | UCB Radcure UCB Radcure |
| Ebecryl 3200 | Acrylated Epoxy: visc = 3000 cP: tensile = 11,900 psi: elong = 6%: Tg = 118F | UCB Radcure |
| Kronitex TCP | Tricrecyl Phosphate: Flame Retardant | FMC Corp |
| Santicizer 143 | Modified Triaryl Phosphate Ester | Solutia |
| Santicizer 148 | Isodecyl Diphenyl Phosphate | Solutia |
| Santicizer 154 | Triaryl Phosphate Ester: t-Butylphenyl Diphenyl Phosphate | Solutia |
| NOVOC RGS-2020DV | Modified Vinyl Ester: WPE = 300–2800: Visc = 800 cP: Acid Value = 14–20 | Composite Technology |
| Veova 10 | Vinyl Ester Of Tertiary Carboxylic acid: Neodecanoic acid, ethenyl ester: visc = 8 cP | Walsh & Assoc/Shell |

| Components Wt. % | Sample No. 1 | 2 | 3 | 4 |
|---|---|---|---|---|
| Part A | | | | |
| Epon 828 | 60 | 60 | 60 | 60 |
| BK 5799 (carbon Black) | 4 g | 4 g | 4 g | 4 g |
| Part B | | | | |
| Santicizer 97 | 15 | 15 | 15 | 15 |
| H$_3$PO$_4$ (conc) | 7.5 | 7.5 | 7.5 | 7.5 |
| Micropearls F30D | 8 | 8 | 8 | 8 |
| Intelimer 7004 | | 1.5 | | |
| Intelimer 7024 | | | 1.5 | |
| Intelimer 7124 | | | | 1.5 |
| Initial Rxn Time (sec) | 51 sec | 64 sec | 78 sec | 81 sec |
| Shrinkage | 0 mm | 0 mm | 0 mm | 0 mm |
| % Height Expansion | 221% | 238% | 257% | 234% |
| Density 2 (g/in$^3$) | | | | |
| Top | 4.53 | 4.51 | 4.72 | 4.20 |
| Bottom | 4.87 | 4.93 | 5.25 | 4.76 |
| Specific Gravity | | | | |
| % H$_3$O Absorption 2 | 2.8% 2.0% | 4.8% 3.0 | 6.8% 4.9% | 7.5% 5.2% |
| Shore A: Initial | 81 85 | 80 82 | 86 85 | 75 77 |
| Shore A - After 24 hr Water Soak | 82 84 | 79 79 | 80 78 | 72 71 |

| Components Wt. % | Sample No. 5 | 6 | 7 | 8 | 9 |
|---|---|---|---|---|---|
| Part A | | | | | |
| Epon 828 | 60 | | | 30 | 30 |
| BK 5799 | 4 g | | | | |
| Epon 826 | | 60 | 60 | 30 | 30 |
| Z6040 | | | | | 1 |
| Part B | | | | | |
| Santicizer 97 | | 15 | 28.46 | 28.46 | 28.46 |
| H$_3$PO$_4$ (conc) | 7.5 | 7.5 | 13.34 | 13.34 | 13.34 |
| Micropearls F30D | 8 | 8 | 14.23 | 14.23 | 14.23 |
| CD 513 | 15 | | | | |
| Initial Rxn Time (sec) | 92 sec | 50 sec | 32 sec | 31 sec | 32 sec |
| Shrinkage | 0 mm | 0 mm | 0 mm | 0 mm | 0 mm |
| % Height Expansion | 383% | 278% | 238% | 209% | 240% |
| Density 1 (g/in$^3$) | | | | | |
| Density 2 (g/in$^3$) | | | | | |
| Top | | 4.75 | 3.72 | 5.05 | 4.50 |
| Bottom | | 4.78 | 4.15 | 4.62 | 4.45 |
| % H$_2$O Absorption 1 | | | | | |
| % H$_2$O Absorption 2 | | 54% 71% | 74% 38% | 11% 9% | 15% 13% |
| Shore A: Initial | | 90 86 | 74 77 | 89 87 | 83 80 |
| Shore A - After 24 hr Water Soak | | 78 75 | 45 57 | 70 73 | 57 56 |
| Shore A: % Drop After 24 hr H$_2$O Soak | | 13%↓, 13%↓ | 39%↓, 39%↓ | 21%↓, 16%↓ | 31%↓, 30%↓ |

-continued

| Components Wt. % | Sample No. 10 | 11 | 12 | 13 | 14 |
|---|---|---|---|---|---|
| Part A | | | | | |
| Epon 828 | 30 | 60 | 60 | 30 | 40 |
| BK 5799 | | | | 4 g) | 4 g |
| Epon 826 | 30 | | | 30 | |
| Z6040 | 1 | 2.5 | 3.5 | 2 | |
| PEP 6264 | | | | | 20 |
| Part B | | | | | |
| Santicizer 97 | 28.46 | 28.46 | 28.46 | 25.14 | 15.5 |
| $H_3PO_4$ (conc) | 11 | 13.34 | 13.34 | 11.79 | 7.5 |
| Micropearls F30D | 14.23 | 14.23 | 14.23 | 12.57 | 8 |
| Initial Rxn Time (sec) | 45 sec | 38 sec | 47 sec | 44 sec | 281 sec |
| Shrinkage | 0 mm | 0 mm | 0.5 mm | 0.5 mm | 0.5 mm |
| % Height Expansion | 178% | 232% | 227% | 233% | 50% |
| Density 1 (g/in$^3$) | | | | | |
| Density 2 (g/in$^3$) | | | | | |
| Top | 6.11 | 4.53 | 5.14 | 4.13 | |
| Bottom | 6.08 | 4.13 | 4.83 | 4.46 | |
| % $H_2O$ Absorption 1 | | | | | |
| % $H_2O$ Absorption 2 | 24% 26% | 56% 41% | 73% 86% | 27% 20% | |
| Shore A: Initial | 84 86 | 72 67 | 81 79 | 83 80 | |
| Shore A - After 24 hr Water Soak | 67 68 | 30 31 | 44 38 | 50 48 | |
| Shore A: % Drop After 24 hr $H_2O$ Soak | 20%↓, 21%↓ | 58%↓, 54%↓ | 46%↓, 52%↓ | 40%↓, 40%↓ | |

| Components Wt % | Sample No. 15 | 16 | 17 | 18 |
|---|---|---|---|---|
| Part A | | | | |
| Epon 828 | 40 | 40 | 40 | 40 |
| BK 5799 | 4 g | 4 g | 4 g | 4 g |
| PEP 6264 | 20 | | | |
| PEP 6137 | | 20 | | |
| PEP 6138 | | | 20 | |
| PEP 6139 | | | | 20 |
| Part B | | | | |
| Santicizer 97 $1.22/lb | 15.5 | 15.5 | 15.5 | 15.5 |
| $H_3PO_4$ (conc) $0.70/lb | 10 | 7.5 | 7.5 | 7.5 |
| Micropearls F30D $8/lb | 8 | 8 | 8 | 8 |
| Initial Rxn Time (sec) | 116 sec | 74 sec | 81 sec | 77 sec |
| Shrinkage | 0.5 mm | 0 mm | 0 mm | 0 mm |
| % Height Expansion | 55% | 210% | 223% | 204% |
| Density 1 (g/in$^3$) | | | | |
| Density 2 (g/in$^3$) | | | | |
| Top | 11.88 | 4.64 | 4.27 | 4.44 |
| Bottom | | 5.24 | 4.94 | 4.99 |
| % $H_2O$ Absorption 1 | | | | |
| % $H_2O$ Absorption 2 | 20% | 4% 3% | 6% 5% | 5% 3% |
| Shore A: Initial | 96 | 84 86 | 78 84 | 85 87 |
| Shore A - After 24 hr Water Soak | 90 | 73 75 | 63 66 | 72 70 |
| Shore A: % Drop After 24 hr $H_2O$ Soak | 6%↓ | 13%↓, 13%↓ | 19%↓, 21%↓ | 15%↓, 20%↓ |

| Components Wt % | Sample No. 19 | 20 | 21 | 22 |
|---|---|---|---|---|
| Part A | | | | |
| Epon 828 | | 40 | 45 | 50 |
| BK 5799 (carbon black) | | | | |
| NPEK-119 | 60 | 10 | | |
| DER 736 | | | 15 | |
| CD 513 | | | | 10 |
| Part B | | | | |
| Santicizer 97 | 15 | 24.73 | 24.73 | 28.8 |
| $H_3PO_4$ (>85% conc) | 7.5 | 11.6 | 11.6 | 13.5 |
| Micropearls F30D | 8 | 12.37 | 12.37 | 14.4 |
| Initial Rxn Time | 68 sec | 33 sec | instant | 44 sec |
| % Ht Expansion | 233% | 241% | | 190% |

-continued

| Density (g/in³) | | | |
|---|---|---|---|
| Top | 4.50 | 4.18 | 4.01 |
| Bot | 4.28 | 4.72 | 4.44 |
| H₂O Absorption | 25% 12% | 25% 13% | 151% |
| Shore A: Initial | 85 81 | 75 82 | 67 68 |
| Shore A: After Water Soak | 67 58 | 52 60 | 10 16 |
| Shore A % Drop After Water Soak | 21%↓, 28%↓ | 27%↓,27%↓ | 85%↓, 77%↓ |
| Shrinkage | 0.2% | <2% | |

| Components Wt. % | Sample No. 23 | 24 | 25 |
|---|---|---|---|
| Part A | | | |
| Epon 828 | 50 | 30 | 30 |
| BK 5799 (carbon black) | | 4 g | 4 g |
| Z 6040 | 2.5 | 2 | |
| Epon 826 | | 30 | 30 |
| Part B | | | |
| Santicizer 97 | 22.86 | 25.14 | 16.76 |
| H₃PO₄ (>85% conc) | 11.9 | 11.79 | 7.86 |
| Micropearls F30D | 12.7 | 12.57 | 8.38 |
| Kraton D1107 | 2.54 | | |
| Initial Rxn Time | 33 sec | 44 sec 53 sec | 49 sec |
| % Ht Expansion | 228% | 233% 204% | 210% |
| Density (g/in³) | | | |
| Top | 4.12 | 4.13 | 4.53 |
| Bot | 4.47 | 4.46 | 5.09 |
| H₂O Absorption | (72 hrs: 118% 148%) | 27% 20% | 3% 2% |
| Shore A: Initial | 78 71 | 83 80 | 85 89 |
| Shore A: After Water Soak | (72 hrs: 25 26) | 50 48 | 79 82 |
| Shore A % Drop After Water Soak | 72 hrs Soak 68%↓, 63%↓ | 40%↓, 40%↓ | 7%↓, 8%↓ |
| Shrinkage | 0.2% | 0.9% | 0.6% |

| Components Wt % | Sample No. 26 | 27 | 28 | 29 |
|---|---|---|---|---|
| Part A | | | | |
| Epon 828 | 30 | 30 | 30 | 60 |
| BK 5799 (carbon black) | 4 g | 4 g | 4 g | 4 g |
| Epon 826 | 30 | 30 | 30 | |
| PEP 6210 PA | 10 | | | |
| Cardura E-10 | | | 10 | 10 |
| Part B | | | | |
| Santicizer 97 | 16.76 | 16.76 | 16.76 | 16.76 |
| H₃PO₄ (>85% conc) | 7.86 | 7.86 | 7.86 | 7.86 |
| Micropearls F30D | 8.38 | 8.38 | 8.38 | 8.38 |
| Initial Rxn Time | 183 sec | 44 sec | 63 sec | 57 sec ? |
| % Ht Expansion | <50% | 197% | 257% | 250% |
| Density (g/in³) | | | | |
| Top | | 4.97 | 5.19 | 5.34 |
| Bot | | 5.42 | 4.72 | 5.33 |
| H₂O Absorption | | 3% 3% | 26% 17% | 9% 4% |
| Shore A: Initial | | 87 89 | 88 82 | 88 84 |
| Shore A: After Water Soak | | 82 84 | 62 57 | 63 56 |
| Shore A % Drop After Water Soak | | 6%↓, 6%↓ | 30%↓, 31%↓ | 28%↓, 33%↓ |
| Shrinkage | | 0.2% | 2.1% | 2.5% |

| Components Wt % | Sample No. 30 | 31 |
|---|---|---|
| Part A | | |
| Epon 828 | 65.5 | 65.5 |
| BK 5799 (carbon black) | 4 g | 4 g |
| Cardura E-10 | 3.5 | 3.5 |
| Part B | | |
| Santicizer 97 | 17 | 17 |
| H₃PO₄ (>85% conc) | 7.5 | 7.5 |
| Micropearls F30D | 8.5 | |
| Initial Rxn Time | 84 | 53 |
| % Ht Expansion | 205% 215% | 0% |
| Density (g/in³) | | |
| Top | 5.09 | — |

-continued

| Components Wt % | | | |
|---|---|---|---|
| Bot | 5.60 | 18.83 | |
| H₂O Absorption | (72 hrs: 4% 3%) | 0.22% (96 hrs) | |
| Shore A: Initial | 90 90 | >100 | |
| Shore A: After Water Soak | (72 hrs: 87 86) | >100 (96 hrs) | |
| Shore A % Drop After Water Soak | (72 hrs: 3%↓, 4%↓) | 0% (96 hrs) | |
| Shrinkage | 0.4% | 3% | |
| Compression: 1"d (psi) | 1483 1450 | | |
| Compression: 2"d (psi) | 1113 | | |

| Components Wt % | Sample No. 32 | 33 | 34 | 35 |
|---|---|---|---|---|
| Part A | | | | |
| Epon 828 | 65.5 | 65.5 | 65.5 | 65.5 |
| BK 5799 (carbon black) | 4 g | 4 g | 4 g | |
| Cardura E-10 | 3.5 | 3.5 | 3.5 | 3.5 |
| Expancel 051DU | 5 | | | |
| Part B | | | | |
| Santicizer 97 | 17 | 8.5 | | |
| H₃PO₄ (>85% conc) | 7.5 | 7.5 | 7.5 | 7.5 |
| Micropearls F30D | | 8.5 | 8.5 | 8.5 |
| Expancel 051DU | | | | |
| Veova 10 | | 8.5 | | 7 |
| Santolink XI-100 | | | 17 | |
| Cardura E-10 | | | | 10 |
| Initial Rxn Time | 120+ sec | 94 sec | 232 sec | 77 sec |
| % Ht Expansion | <25% | 137% | 258% | 206% |
| Density (g/in³) | | | | |
| Top | | | 4.16 | 4.68 |
| Bot | | | 4.19 | 5.27 |
| H₂O Absorption | | | 2% 2% | 1.3% 1% |
| Shore A: Initial | | | 73 75 | 79 79 |
| Shore A: After Water Soak | | | 61 64 | 70 69 |
| Shore A % Drop After Water Soak | | | 16%↓, 15%↓ | 11%↓, 13%↓ |
| Shrinkage | | | 0.7% | 1% |

| Components Wt % | Sample No. 36 | 37 | 38 | 39 | 40 |
|---|---|---|---|---|---|
| Part A | | | | | |
| Epon 828 | 55.5 | | 95 | 65.5 | 65.5 |
| Cardura E-10 | 3.5 | 3.5 | 5 | 3.5 | 3.5 |
| Erisys GE-60 | 10 | | | | |
| Epalloy 8240 | | 65.5 | | | |
| BK 5799 (carbon Black) | | | 4 g | 4 g | |
| Micropearls F30D | | | | | 8.5 |
| Part B | | | | | |
| H₃PO₄ (>85% conc) | 7.5 | 7.5 | 11 | 7.5 | 7.5 |
| Micropearls F30D | 8.5 | 8.5 | 8.5 | 8.5 | |
| Cardura E-10 | 12 | 12 | | 12 | |
| Veova 10 | 5 | 5 | | | |
| Santicizer 97 | | | 17 | 5 | |
| Initial Rxn Time | 69 sec | 75 sec | 63 sec | 203 sec | 17 sec |
| % Ht Expansion | 130% | 229% | 166% | 245% | 335% |
| Density (g/in³) | | | | | |
| Top | | 4.63 | 5.83 | 4.46 | |
| Bot | | 5.42 | 6.11 | 4.99 | |
| H₂O Absorption | | (72 hrs) 5% 3% | 1% 1% | 10% 6% (72 hrs) | |
| Shore A: Initial | | 74 74 | 94 95 | 76 76 | |
| Shore A: After Water Soak | | (72 hrs) 69 67 | 91 91 | 65 66 (72 hrs) | |
| Shore A % Drop After Water Soak | | (72 hrs) 7%↓, 10%↓ | 3%↓, 4%↓ | 15%↓, 13%↓ (72 hrs) | |
| Shrinkage | Slight | 1% | 0.4% 0.5% | 1.1% | |
| Compression: 1"d (psi) | | | 2724 2504 | | |

| Components Wt % | Sample No. 41 | 42 | 43 | 44 | 45 |
|---|---|---|---|---|---|
| Parts A | | | | | |
| Epon 828 | 65.5 | 65.5 | 65.5 | 65.5 | 65.5 |
| Cardura E-10 | 3.5 | 3.5 | 3.5 | 3.5 | 3.5 |
| BK 5799 (carbon Black) | 4 g | 4 g | 4 g | 4 g | 4 g |

-continued

| Part B | | | | | |
|---|---|---|---|---|---|
| H₃PO₄ (>85% conc) | 7.5 | 7.5 | 7.5 | 7.5 | 7.5 |
| Micropearls F30D | 8.5 | 8.5 | 8.5 | 8.5 | 8.5 |
| Ebecryl 2047 | 17 | | | | |
| Ebecryl 3200 | | 17 | | | |
| CD 9051 | | | 17 | | |
| CD 9050 | | | | 17 | |
| SR 444 | | | | | 17 |
| Initial Rxn Time | 81 sec | 92 sec | 63 sec | 82 sec | 71 sec |
| % Ht Expansion | 275% | 275% | 285% | 290% | 300% |
| Density (g/in³) | | | | | |
| Top | 4.69 | 3.92 | 3.67 | 3.89 | 3.59 |
| Bot | 4.70 | 4.75 | 4.20 | 4.06 | 4.12 |
| H₂O Absorption | 32%? 2% | 3% 27%? | 6% 3% | 29% 42% | 15% 10% (see 1 below) |
| Shore A: Initial | 88 83 | 83 83 | 81 82 | 78 80 | 78 78 |
| Shore A: After Water Soak | 78 73 | 70 73 | 66 67 | 52 51 | 75 75 |
| Shore A % Drop After Water Soak | 11%↓, 12%↓ | 16%↓, 12%↓ | 19%↓, 18%↓ | 33%↓, 36%↓ | 4%↓, 4%↓ |
| Shrinkage | 1.1% | 0.2% | 0.3% | 2% | 1.2% |

| Components Wt % | Sample No. 46 | 47 | 48 | 49 |
|---|---|---|---|---|
| Part A | | | | |
| Epon 828 | 65.5 | 65.5 | 65.5 | 55.5 |
| Cardura E-10 | 3.5 | 3.5 | 3.5 | 3.5 |
| BK 577 (carbon Black) | 4 g | 4 g | 4 g | 4 g |
| Epalloy 8240 | | | | 10 |
| Erisys GE-60 | | | | |
| Part B | | | | |
| H₃PO₄ (>85% conc) | 7.5 | 7.5 | 7.5 | 7.5 |
| Micropearls F30D | 8.5 | 8.5 | 8.5 | 8.5 |
| Santicizer 278 | 17 | | | |
| SR 9009 | | 17 | | |
| SR 239 | | | 17 | |
| Santicizer 97 | | | | 17 |
| Initial Rxn Time | 54 sec | 54 sec | 79 sec | 49 sec |
| % Ht Expansion | 260% | 268% | 320% | 214% |
| Density (g/in³) | | | | |
| Top | 4.07 | 3.99 | 3.63 | 4.82 |
| Bot | 4.83 | 4.41 | 4.20 | 5.41 |
| H₂O Absorption | 27% 4% (see 1) | 53% 39% (see 1) | 12% 9% | 3% 2% |
| Shore A: Initial | 80 82 | 85 85 | 69 71 | 86 87 |
| Shore A After Water Soak | 67 72 | 77 79 | 65 67 | 83 85 |
| Shore A % Drop After Water Soak | 16%↓, 12%↓ | 9%↓, 7%↓ | 6%↓, 6%↓ | 4%↓, 2%↓ |
| Shrinkage | 0.6% | 2% | 6% | 0.3% |

| Components Wt % | Sample No. 50 | 51 | 52 | 53 |
|---|---|---|---|---|
| Part A | | | | |
| Epon 828 | 65.5 | 55.5 | 55.5 | 55.5 |
| Cardura E-10 | 3.5 | 3.5 | 3.5 | 3.5 |
| BK 5799 (carbon Black) | 4 g | 4 g | 4 g | 4 g |
| Micropearls F30D | 8.5 | | | |
| PEP 6433 | | 10 | | |
| PEP 6431 | | | 10 | |
| Epalloy 8240 | | | | 10 |
| Part B | | | | |
| Santicizer 97 | 17 | 17 | 17 | 17 |
| H₃PO₄ (>85% conc) | 7.5 | 7.5 | 7.5 | 7.5 |
| Micropearls F30D | | 8.5 | 8.5 | 6.5 |
| Initial Rxn Time | 56 sec | 88 sec | 51 sec | 52 sec |
| % Ht Expansion | 165% | 133% | 157% | 123% |
| Density (g/in³) | | | | |
| Top | 5.39 | 8.98 | 5.72 | 7.15 |
| Bot | 5.82 | 9.59 | 6.30 | 7.63 |
| H₂O Absorption | 2% 1% (72 hrs) | 36% 29% | 0.7% 0.7% | 0.5% 0.4% |
| Shore A: Initial | 89 90 | 97 98 | 91 94 | 97 97 |
| Shore A: After Water Soak | 85 87 | 93 94 | 87 91 | 95 95 |

-continued

| | | | | | |
|---|---|---|---|---|---|
| Shore A % Drop After Water Soak | 5%↓, 3%↓ (72 hrs) | 4%↓, 4%↓ | 4%↓, 3%↓ | 2%↓, 2%↓ | |
| Shrinkage | 0.4% | 0.2% | 0.1% | 0.3% | |
| Compression: 1"d (psi) | | | 1886 2090 | | |
| Compression: 2"d (psi) | | | | 2190 | |

| Components Wt % | Sample No. 54 | 55 | 56 | 57 | 58 |
|---|---|---|---|---|---|
| Part A | | | | | |
| Epon 828 | 50 | 65.5 | 55.5 | 65.5 | 55 |
| Cardura E-10 | | 3.5 | 3.5 | 3.5 | 3.5 |
| BK 5799 (carbon Black) | 4 g | 4 g | 4 g | 4 g | 4 g |
| Epalloy 8240 | 20 | | | | |
| PEP 6431 | | | 10 | | |
| PBD 605 | | | | | 10 |
| Part B | | | | | |
| Santicizer 97 | 17 | 12 | 17 | 20.4 | 20.4 |
| H$_3$PO$_4$ (>85% conc) | 7.5 | 7.5 | 7.5 | 9 | 9 |
| Micropearls F30D | 8.5 | 3.5 | 5 | 2.5 | 4 |
| Initial Rxn Time | 57 sec | 51 sec | 56 sec | 54 sec 51 sec | 37 sec |
| % Ht Expansion | 213% | 45% | 40% | 23% 30% | 21% |
| Density (g/in$^3$) | | | | | |
| Top | 5.21 | 10.77 | — | 12.28 | |
| Bot | 5.87 | 10.89 | 9.44 | 12.41 | |
| H$_2$O Absorption | 2% 0.9% | 0.2% | 0.6% (72 hrs) | 1.1% (5 days) | |
| Shore A: Initial | 88 92 | 100 | 99 | 100+ | |
| Shore A: After Water Soak | 85 88 | 99 | 98 (72 hrs) | 98 (5 days) | |
| Shore A % Drop After Water Soak | 3%↓, 5%↓ | 1%↓ | 1%↓ (72 hrs) | 2%↓ (5 days) | |
| Shrinkage | 0.1% | 1.4% | 0.8% | 1.9% | |
| Compression: 1"d (psi) | 1825 1939 | 4875 4768 | 3472 4070 | 5762 6141 | 5132 4874 |

| Components Wt % | Sample No. 59 | 60 | 61 |
|---|---|---|---|
| Part A | | | |
| Epon 828 | 150.65 | 65.5 | 65.5 |
| Cardura E-10 | 8.05 | | |
| BK 5799 (carbon Black) | 4 g | 4 g | 4 g |
| Veova 10 | | 10 | |
| Z 6040 | | | 2 |
| Part B | | | |
| Santicizer 97 | 17 | 17 | 17 |
| H$_3$PO$_4$ (>85% conc) | 16 | 7.5 | 7.5 |
| Micropearls F30D | 5 | 6.5 | 6.5 |
| Initial Rxn Time | 42 sec 30 sec | 54 sec | 96 sec |
| % Ht Expansion | 20% | 20% | 122% |
| Compression: 1"d (psi) | 7212 7201 | | 1955 1940 |

| Components Wt % | Sample No. 62 | 63 | 64 |
|---|---|---|---|
| Part A | | | |
| Epon 828 | 65.5 | 65.5 | 65.5 |
| Cardura E-10 | 3.5 | | 3.5 |
| BK 5799 (carbon black) | 4 g | 4 g | 4 g |
| Santicizer 97 | | 3.5 | |
| Part B | | | |
| Santicizer 97 | 20 | 20.4 | |
| H$_3$PO$_4$ (>85% conc) | 6.5 | 9 | 9 |
| Micropearls F30D | 4.5 | 2.5 | 2.5 |
| RGS-2020 DV | | | 20.4 |
| Initial Rxn Time | 81 sec | 58 sec | 175 sec |
| % Ht Expansion | 32% | 23% | 67% |
| Density (g/in$^3$) | | | |
| Top | | 11.44 | 9.54 |
| Bot | 11.4 | 11.38 | 10.21 |
| H$_2$O Absorption | (72 hrs) 0.4% | 0.9 | 1.3% |
| Shore A: Initial | 100+ | 100+ | 98 |
| Shore A: Water Soak | (72 hrs) 100 | 99 | 91 |
| Shore A % Drop After Water Soak | (72 hrs) 0%+ | 1%+ | 7% |

-continued

| | | | |
|---|---|---|---|
| Salt: % Absorption | 0.5% | 1.5% | |
| Salt: % Shore A Drop | 1%+ | 16%+ | |
| Shrinkage | 1.1 | 1.6% | 2.2% |
| Compression: 1"d (psi) | 4116 4452 | 4382 4933 | 3784 3786 |
| Heat Age Rating | 2 | 3 | |

| Components Wt % | Sample No. 65 | 66 |
|---|---|---|
| Part A | | |
| Epon 828 | 42.8 | 50.4 |
| Erisys GE-29 | 12.8 | 4.2 |
| Micropearls F30D | 12.8 | 10.8 |
| BK 5799 (carbon black) | 4 g | 4 g |
| Part B | | |
| Santicizer 97 | 17.6 | 18 |
| Santicizer 154 | 4.4 | 4.5 |
| $H_3PO_4$ (>85% conc) | 13.2 | 11.2 |
| Initial Rxn Time | 25 sec | 30 sec |
| % Ht Expansion | 287% | 275% |
| Density (g/in$^3$) | | |
| Top | | 3.72 |
| Bot | | |
| $H_2O$ Absorption | 34% | |
| Shore A: Initial | 45 | 71 |
| Shore A: Water Soak | 14 | |
| Shore A % Drop After Water Soak | 69% | |
| Shrinkage | 0.5% | 0.2% |
| Flammability (vert) | Torch | Torch |
| Flame Time | 3 sec | 7 sec |
| Burn Length | 0.06–0.19 in | 3.75–7 in |
| Flammability (horiz) | Torch | Torch |
| Flame Time | 5 sec | 6 sec |
| Burn Length | 3.25–3.75 in | — |

A skilled person in this art would understand that these exemplary processes an be modified by manipulating process variables such as time and temperature of each aforementioned mixing step, mixing rate (RPM), time under vacuum, radiation source (e.g., UV light) and length of exposure and distance from source, and level of vacuum (mm Hg) as well as operating a continuous process. While the above Examples illustrate a batch process a skilled person in this art after having reviewed and understood the instant disclosure, would be capable of manipulating the aforementioned process variables to tailor the instant composition for a virtually unlimited array of product applications.

While the present invention has been described in certain preferred embodiments thereof, it will be apparent that various substitution, omissions, modifications, and other changes which may be made without departing from the spirit of the invention. Thus, the present invention should be limited only by the scope of the following claims including equivalents thereof.

What is claimed is:

1. A foam precursor comprising:
    (a) an A-side foam precursor composition comprising at least halogenated epoxy functional compound, and a blowing agent, and;
    (b) a B-side foam precursor composition comprising an acid source and at least one dialkyl adipate; wherein at least one of said foam precursors is encapsulated.

2. The foam precursor according to claim 1 wherein (a) further includes a modifying material.

3. The foam precursor according to claim 1 wherein (b) further comprises a carrier material.

4. The foam precursor of claim 1 wherein said blowing agent comprises an encapsulated blowing agent and the encapsulated blowing agent has at least two different activation temperatures.

5. The foam precursor of claim 1 wherein the encapsulated blowing agent comprises a thermoplastic shell that contains at least one of isobutane and isopentane blowing agent.

6. The foam precursor of claim 1 wherein at least one of the A-side precursor and the B-side precursor further comprises castor oil, at least one benzyl phthalate and at least one member selected from the group consisting of Bis A epoxy and Bis F epoxy.

7. The foam precursor of claim 1 wherein said epoxy compound is a bis-A or bis-F epoxy compound; the blowing agent comprises at least one of isopentane and isobutane and the A-side precursor further comprises at least one member selected from the group consisting of polypropylene, polyethylene and polyvinyl alcohol.

8. A method for producing a foam comprising:
    (a) combining an A-side foam precursor comprising at least one epoxy functional compound with a B-side foam precursor comprising at least one hydrogen donating Lewis acid and at least one dialkyl adipate, wherein at least one of said A-side and B-side comprise an encapsulated blowing agent, under conditions sufficient to provide an exothermic reaction within less than about 2 minutes from said combining; and
    (b) utilizing heat from the exothermic reaction so as to expand the combined components to form a foam.

9. The method of claim 8 wherein said at least one hydrogen donating Lewis acid comprises phosphoric acid.

10. The method of claim 9 wherein said phosphoric acid is substantially water free.

11. The method of claim 8 wherein said combining comprises dispensing through a mixing device comprising a static mix head.

12. The method of claim 8 wherein the combined A-side and B-side are dispensed into a containment device.

13. The method of claim 11 wherein said static mix head is affixed in a manner to substantially seal a cavity into which the foam is dispensed.

* * * * *